US012299613B1

(12) United States Patent
Boyd et al.

(10) Patent No.: US 12,299,613 B1
(45) Date of Patent: May 13, 2025

(54) IMPLEMENTING USER INPUT AND DERIVED IMAGE AND TEXT FROM ENGINEERING DRAWINGS TO MAP MANUFACTURING REQUIREMENTS TO A SUBSET OF MANUFACTURERS VIA NATURAL LANGUAGE AGENT PROGRAMS

(71) Applicant: Sustainment Technologies, Inc., Austin, TX (US)

(72) Inventors: Bret Boyd, Austin, TX (US); John Michael Rozmus, Manor, TX (US); Kyle Robert Sperling, Archbold, OH (US); Quinn Meyer, Saginaw, MI (US); Junsu Kim, Austin, TX (US)

(73) Assignee: Sustainment Technologies, Inc., Austin, TX (US)

(*) Notice: Subject to any disclaimer, the term of this patent is extended or adjusted under 35 U.S.C. 154(b) by 0 days.

(21) Appl. No.: 18/748,873

(22) Filed: Jun. 20, 2024

(51) Int. Cl.
*G06Q 10/0631* (2023.01)
*G06Q 50/04* (2012.01)
(Continued)

(52) U.S. Cl.
CPC ..... *G06Q 10/063112* (2013.01); *G06Q 50/04* (2013.01); *G06V 30/274* (2022.01); *G06V 30/42* (2022.01)

(58) Field of Classification Search
CPC .......... G06Q 10/063112; G06Q 50/04; G06V 30/274; G06V 30/42
See application file for complete search history.

(56) References Cited

U.S. PATENT DOCUMENTS

| 10,061,300 B1 | 8/2018 | Coffman et al. |
| 10,274,933 B2 | 4/2019 | Coffman et al. |

(Continued)

FOREIGN PATENT DOCUMENTS

| WO | WO-2024189328 A1 * | 9/2024 |
| WO | WO-2024220444 A2 * | 10/2024 |

OTHER PUBLICATIONS

Angrish, Atin, Benjamin Craver, and Binil Starly. "FabSearch": A 3D CAD model-based search engine for sourcing manufacturing services. Journal of Computing and Information Science in Engineering 19.4 (2019): 041006. (Year: 2019).*

(Continued)

*Primary Examiner* — Brian L Albertalli
(74) *Attorney, Agent, or Firm* — KOKKA & BACKUS, PC

(57) ABSTRACT

Techniques for computer science, data science, data analytics, computer software, algorithmic analysis, and networked technologies for sourcing, procurement, manufacturing, and supply chain management in small-to-medium manufacturing ("SMM") industries that involve processes whereby implementing user input and extracted image and text from engineering drawings may be used to map manufacturing requirements to a subset of manufacturers via natural language agent programs. More specifically, natural language agent programs may be implemented to apply input and extracted image and text from engineering drawings to a large language model ("LLM"). An example method may include receiving a user input including data representing requirements to manufacture a physical structure, concatenating an engineering drawing summary data, a shoptype description, and estimated part size instruction data to combine the at least two of the engineering drawing summary data, the shoptype description, and the estimated part size (Continued)

instruction data to generate a subset (e.g., a list) of qualified manufacturers (e.g., SMMs).

20 Claims, 13 Drawing Sheets

(51) Int. Cl.
  *G06V 30/262* (2022.01)
  *G06V 30/42* (2022.01)

(56) References Cited

U.S. PATENT DOCUMENTS

| | | | |
|---|---|---|---|
| 10,281,902 | B2 | 5/2019 | Coffman et al. |
| 10,338,565 | B1 | 7/2019 | Coffman et al. |
| 10,558,195 | B2 | 2/2020 | Coffman et al. |
| 10,712,727 | B2 | 7/2020 | Coffman et al. |
| 11,086,292 | B2 | 8/2021 | Coffman et al. |
| 11,347,201 | B2 | 5/2022 | Coffman et al. |
| 11,415,961 | B1* | 8/2022 | Jacobs, II ............... G06Q 50/04 |
| 2003/0221172 | A1* | 11/2003 | Brathwaite ........... G06F 30/398 |
| | | | 716/100 |
| 2009/0063309 | A1* | 3/2009 | Stephens ................ G06Q 10/06 |
| | | | 705/29 |
| 2018/0120813 | A1 | 5/2018 | Coffman et al. |
| 2018/0341246 | A1 | 11/2018 | Coffman et al. |
| 2019/0271966 | A1 | 9/2019 | Coffman et al. |
| 2019/0339669 | A1 | 11/2019 | Coffman et al. |
| 2020/0183355 | A1 | 6/2020 | Coffman et al. |
| 2020/0348646 | A1 | 11/2020 | Coffman et al. |
| 2021/0089767 | A1* | 3/2021 | Ashek ..................... G06V 10/44 |
| 2023/0051313 | A1* | 2/2023 | Wang ...................... G06F 30/31 |
| 2023/0214583 | A1* | 7/2023 | Sawyer ............ G06V 30/19173 |
| 2024/0176321 | A1* | 5/2024 | Shapiro ................ G05B 19/182 |
| 2024/0193539 | A1 | 6/2024 | Leu et al. |
| 2024/0289733 | A1* | 8/2024 | Singh ............... G06Q 10/08345 |

OTHER PUBLICATIONS

Picard, Cyril, et al. "From concept to manufacturing: Evaluating vision-language models for engineering design." arXiv preprint arXiv:2311.12668 (2023). (Year: 2023).*
Meltzer, Peter, Joseph G. Lambourne, and Daniele Grandi. "What's in a Name? Evaluating Assembly-Part Semantic Knowledge in Language Models through User-Provided Names in CAD Files." arXiv preprint arXiv:2304.14275 (2023). (Year: 2023).*
Zandbiglari, Kimia, Farhad Ameri, and Mohammad Javadi. "Capability language processing (CLP): Classification and ranking of manufacturing suppliers based on unstructured capability data." IDETC-CIE. vol. 85376. American Society of Mechanical Engineers, 2021. (Year: 2021).*
Gao, Yunfan, et al. "Retrieval-augmented generation for large language models: A survey." arXiv preprint arXiv:2312.10997 (2023). (Year: 2023).*
Chandrasekhar, Achuth, et al. "AMGPT: a Large Language Model for Contextual Querying in Additive Manufacturing." arXiv preprint arXiv:2406.00031 (2024). (Year: 2024).*
Kernan Freire, Samuel, et al. "Knowledge sharing in manufacturing using LLM-powered tools: user study and model benchmarking." Frontiers in Artificial Intelligence 7 (2024): 1293084. (Year: 2024).*
Alam et al., "From Automation to Argumentation: Redefining Engineering Design and Manufacturing in the Age of NextGen-AI," An MIT Exploration of Generative AI, From Novel Chemicals to Opera, Published Mar. 27, 2024, 53 pages, URL: https://mit-genai.pubpub.org/pub/9s6690gd, (Year: 2024).
Bordes et al., "An Introduction to Vision-Language Modeling," arXiv:2405.17247v1 [cs.LG] May 27, 2024, 76 pages (Year: 2024).
Daele et al., "An Automated Engineering Assistant: Learning Parsers for Technical Drawings," The Thirty-Fifth AAAI Conference on Artificial Intelligence (AAAI-21), Association for the Advancement of Artificial Intelligence (Year: 2021).

Firas, Ouerghi, "AI for technical drawings," Master Thesis, Republic of Tunisia, Ministry of Higher Education and Scientific Research, University of Tunis El-Manar, National Engineering School of Tunis, Doctoral school STI, Published Nov. 2020, 94 pages (Year: 2020).
Gramblička et al., "Vectorization of scanned paper-based engineering drawings—contemporary software abilities," Applied Mechanics and Materials vol. 693 (2014), pp. 457-462 (6 pages), DOI: 10.4028/www.scientific.net/AMM.693.457 (Year: 2014).
Haar et al., "AI-Based Engineering and Production Drawing Information Extraction," Fraunhofer Institute for Manufacturing Engineering and Automation IPA, The Authors (2023), K.-Y. Kim et al. (Eds): FAIM 2022, LNME, pp. 374-382, DOI: https://doi.org/10.1007/978-3-031-18326-2_36.
Hagag et al., "Multi-Criteria Decision-Making for Machine Selection in Manufacturing and Construction: Recent Trends," Mathematics 2023, vol. 11, No. 631, Published Jan. 2023, DOI: https://doi.org.10.3390/math11030631, 21 pages (Year: 2023).
Lin et al., "Integration of Deep Learning for Automatic Recognition of 2D Engineering Drawings," Machines 2023, vol. 11, No. 802. DOI: https://doi.org/10.3390/machines11080802. (Year: 2023).
Makatura et al., "Large Language Models for Design and Manufacturing," An MIT Exploration of Generative AI, From Novel Chemicals to Opera, Large Language Models for Design and Manufacturing, Published Mar. 27, 2024, URL: https://mit-genai.pubpub.org/pub/nmypmnhs, 23 pages (Year: 2024).
May et al., "Applying Natural Language Processing in Manufacturing," 10th CIRP Global Web Conference—Material Aspects of Manufacturing Processes, Science Direct, Procedia CIRP 115 (2022), pp. 184-189 (6 pages), Year: 2022.
Merritt, Rick, "What is Retrieval-Augmented Generation, aka Rag?" NVIDIA Blog, Published Nov. 15, 2023, 5 pages, URL: https://blogs.nvidia.com/blog/what-is-retrieval-augmented-generation/, (Year: 2023).
Moreno-García et al., "New trends on digitisation of complex engineering drawings," Neural Computing and Applications (2019) vol. 31, pp. 1695-1712 (18 pages), Published Jun. 13, 2018, DOI: https://doi.org/10.1008/s00521-018-3583-1, (Year: 2018).
Songzhiwei et al., "Segmentation method of U-net sheet metal engineering drawing based on CBAM attention mechanism," arXiv:2209.14102 [cs.CV], Published Sep. 28, 2022, 13 pages (Year: 2022).
Toro et al., "Optical character recognition on engineering drawings to achieve automation in production quality control," Frontiers in Manufacturing Technology, Original Research, Published Mar. 20, 2023, 19 pages, DOI: 10.3389/fmtec.2023-1154132.
Wang et al., "CogVLM: Visual Expert for Pretrained Language Models," arXiv:2311.03079v2 [cs.CV], Feb. 4, 2024, DOI: https://doi.org/10.48550/arXiv.2311.03079 (Year: 2024).
Xie et al., "Graph neural network-enabled manufacturing method classification from engineering drawings," Science Direct, Computers in Industry, 142 (2022) 103697, DOI: https://doi.org/10/1016/j.compind.2022.103697 (Year: 2022).
Yazed et al., "Review of Neural Network Approach on Engineering Drawing Recognition and Future Directions," International Journal on Informatics Visualization, vol. 7, No. 4, pp. 2513-2522 (10 pages), Published Dec. 2023, (Year: 2023).
Yildiz et al., "Investigating Continual Pretraining in Large Language Models: Insights and Implications," arXiv:2402.17400v1 [cs.CL], Feb. 27, 2024, 25 pages (Year: 2024).
Yue et al., "MMMU: A Massive Multi-discipline Multimodal Understanding and Reasoning Benchmark for Expert AGI," arXiv:2311.16502v3 [cs.CL], Dec. 21, 2023, 117 pages, (Year: 2023).
Zhang et al., "Component Segmentation of Engineering Drawings Using Graph Convolutional Networks," Department of Mechanical Engineering, Carnegie Mellon University, arXiv:2212.00290v2 [cs.CV], Mar. 14, 2023, 34 pages. (Year: 2023).
Zhang, Wentai, "Data-driven Analysis of Engineering Drawings Using Component-based Graphs," Submitted in partial fulfillment of the requirements for the degree of Doctor of Philosophy in

(56) References Cited

OTHER PUBLICATIONS

Mechanical Engineering, Carnegie Mellon University, Dec. 2022 (Year: 2022).

\* cited by examiner

IMPLEMENTING USER INPUT AND DERIVED IMAGE AND TEXT FROM ENGINEERING DRAWINGS TO MAP MANUFACTURING REQUIREMENTS TO A SUBSET OF MANUFACTURERS VIA NATURAL LANGUAGE AGENT PROGRAMS

FIELD

The present inventive subject matter relates generally to computer science, data science, data analytics, computer software, algorithmic analysis, and networked technologies for sourcing, procurement, manufacturing, and supply chain management in small-to-medium manufacturing ("SMM") industries that involve complex and varied processes whereby implementing user input and extracted or derived image and text from engineering drawings may be used to map or determine similarities between manufacturing requirements of a part to a subset of manufacturers via natural language agent programs. More specifically, natural language agent programs may be implemented to apply input and extracted or derived image and text from engineering drawings to, for example, a large language model ("LLM").

BACKGROUND

With increasingly sophisticated and complex computational abilities due to increasingly powerful computer processors and software, many public and private entities and organizations are replacing older, manually-intensive processes and workflows. Benefits ranging from the distributed implementation of complex automated processes to the deployment of "artificial intelligence" or highly sophisticated logic or model-based algorithms, such as those found in machine learning, deep learning, and other advanced areas of computing, are enabling the automation of existing processes, accelerating performance (i.e., decreasing latencies), and increasing productivity.

Specifically, a buyer of manufacturing services generally may have difficulty finding manufacturers that have the capabilities to manufacture parts that a buyer desires to be manufactured. There are many manufacturers that have various skills, equipment, varied specialized manufacturing processes, etc., thus making it difficult for a buyer to locate a suitable manufacturer. Further, small-sized manufacturers and medium-sized manufacturers generally have few resources to publicize their manufacturing capabilities.

Moreover, conventional techniques typically employ rudimentary forms of logic such as rules-based logic (i.e., a group of rules that are typically user-specified) or form-driven/forced to try to match a buyer to small-sized manufacturers and medium-sized manufacturers. Usual approaches via rules-based logic are typically inflexible, inaccurate, and time consuming when attempting to match manufacturing supplier capabilities to those of a requirement (e.g., a requirement to manufacture a part for a buyer). This is often the result of disparate data sources, data types, data formats, limited training, and complexity of conventional techniques. Conventional techniques typically rely upon manual searching and evaluation of possible manufacturing suppliers capable of fulfilling manufacturing requirements, which is time consuming and expensive given the need for skilled personnel who are familiar with procurement processes as well as the applications and data flows required to locate a suitable manufacturing supplier.

Buyers of manufactured parts in, for example, the defense sector often need to procure items that were designed and documented many decades ago. These are typically documented by a 2D drawing package composed of scanned images of the original paper drawings. Scanned images may be marred by various kinds of noise or artifacts, for example, smears from liquid damage, very thin or faded lines, or some background stain. Scanned images with noise or artifacts generally impede automated interpretation of scanned images and may be difficult to interpret or ascertain. Buyers of manufactured parts in the commercial sector are typically procuring items that are designed with modern 3D computer aided design ("CAD") software. To specify a part for the manufacturer, 2D drawing packages with product manufacturing information are typically produced by a skilled draftsperson from the 3D CAD model at significant cost.

Thus, what is needed is a solution for identifying and mapping part manufacturing requirements to one or more qualified small-sized and medium-sized manufacturers without the limitations of conventional techniques.

BRIEF DESCRIPTION OF THE DRAWINGS

Various embodiments or examples ("examples") are disclosed in the following detailed description and the accompanying drawings.

DETAILED DESCRIPTION

Figure 1:
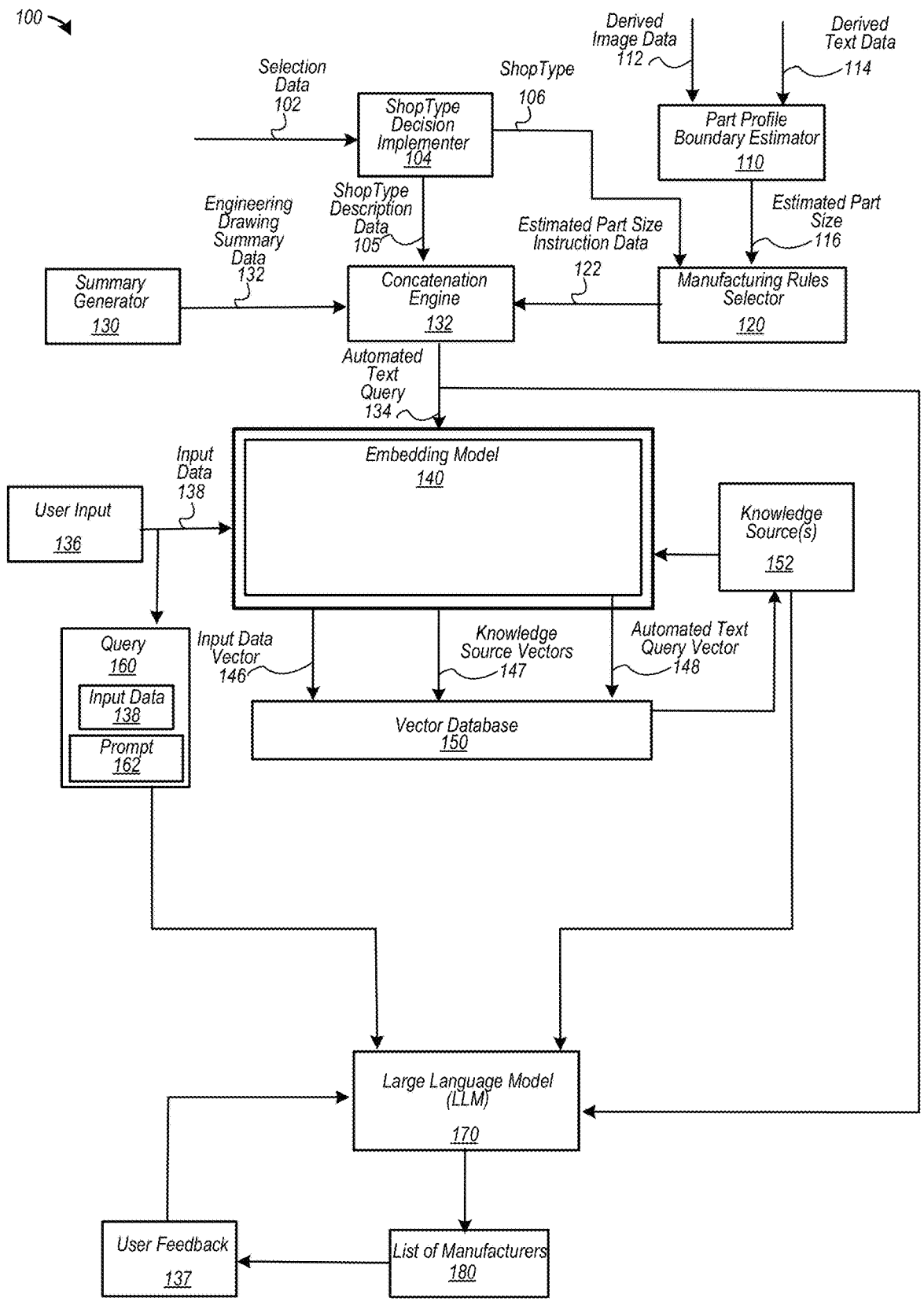
FIG. 1 illustrates an example of a functional block diagram configured to generate a list of manufacturers suitable to comply with manufacturing requirements to manufacture a physical structure, according to some examples.

Various embodiments or examples may be implemented in numerous ways, including as a system, a process, an apparatus, a user interface, or a series of program code or instructions on a computer readable medium such as a storage medium or a computer network including program instructions that are sent over optical, electronic, electrical, quantum, wired, or wireless communication links. In general, individual operations or sub-operations of disclosed processes may be performed in an arbitrary order, unless otherwise provided in the claims.

A detailed description of one or more examples is provided below along with accompanying figures. This detailed description is provided in connection with various examples, but is not limited to any particular example. The scope is limited only by the claims and numerous alternatives, modifications, and equivalents. Numerous specific details are set forth in the following description in order to provide a thorough understanding. These details are provided for the purpose of illustrating various examples and the described techniques may be practiced according to the claims without some or all of these specific details. For clarity, technical material that is known in the technical fields and related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture (e.g., either as a hardware architecture or a software architecture, or a combination thereof) using various computing resources that are configured to provide computing features, functions, processes, elements, components, or parts, without any particular limitation as to the type, make, manufacturer, developer, provider, configuration, programming or formatting language (e.g., JAVA®, JAVASCRIPT®, Python™ and others, without limitation or restriction), service, class, resource, specification, protocol, or other computing or network attributes. As used herein, "software" or "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") and/or software using, hosted on, served from, or otherwise implemented on one or more local, remote, and/or distributed data networks such as the Internet, one or more computing clouds (hereafter "cloud"), or others. Data networks (including computing clouds) may be implemented using various types of standalone, aggregated, or logically-grouped computing resources (e.g., computers, clients, servers, tablets, notebooks, smart phones, cell phones, mobile computing platforms or tablets, and the like) to provide a hosted environment for an application, software platform, operating system, software-as-a-service (i.e., "SaaS"), platform-as-a-service, hosted, or other computing/programming/formatting environments, such as those described herein, without restriction or limitation to any particular implementation, design, configuration, instance, version, build, or state. Distributed resources such as cloud computing networks (also referred to interchangeably as "computing clouds," "storage clouds," "cloud networks," or, simply, "clouds," without restriction or limitation to any particular implementation, design, configuration, instance, version, build, or state) may be used for processing and/or storage of varying quantities, types, structures, and formats of data, without restriction or limitation to any particular implementation, design, or configuration. In the drawings provided herewith, the relative sizes and shapes do not convey any limitations, restrictions, requirements, or dimensional constraints unless otherwise specified in the description and are provided for purposes of illustration only to display processes, data, data flow chart, application or program architecture or other symbols, as described in this Specification.

As described herein, structured and unstructured data may be stored in various types of data structures including, but not limited to databases, data repositories, data warehouses, data stores, or other data structures and facilities configured to manage, store, retrieve, process calls for/to, copy, modify, or delete data or sets of data (i.e., "datasets") in various computer programming languages and formats in accordance with various types of structured and unstructured database schemas and languages such as SQL®, MySQL®, NoSQL™ DynamoDB™, R, or others, such as those developed by proprietary and open source providers like Amazon® Web Services, Inc. of Seattle, Washington, Microsoft®, Oracle®, Google®, Salesforce.com, Inc., and others, without limitation or restriction to any particular schema, instance, or implementation. Further, references to databases, data structures, or any type of data storage facility may include any embodiment as a local, remote, distributed, networked, cloud-based, or combined implementation thereof, without limitation or restriction, including vector databases. In some examples, data may be formatted and transmitted (i.e., transferred over one or more data communication protocols) between computing resources using various types of wired and wireless data communication and transfer protocols such as Hypertext Transfer Protocol (HTTP), Transmission Control Protocol (TCP)/Internet Protocol (IP), Internet Relay Chat (IRC), SMS, text messaging, instant messaging (IM), Wi-Fi, WiMAX, or others, without limitation, via, for example, application programming interfaces ("APIs"). Further, as described herein, disclosed processes implemented as software may be programmed using JAVA®, JAVASCRIPT®, Scala, Perl, Python™, XML, HTML, and other data formats and programming languages, without limitation. As used herein, references to layers of an application architecture (e.g., application layer or data layer) may refer to a stacked layer application architecture designed and configured using models such as the Open Systems Interconnect (OSI) model or others.

The described techniques may be implemented as a software-based application, platform, or schema. In some examples, machine or deep learning algorithms such as those used in computing fields associated with "artificial intelligence" may be used. While there is no particular dependency to a given type of algorithm (e.g., machine learning, deep learning, neural networks, intelligent agents, or any other type of algorithm that, through the use of computing machines, attempts to simulate or mimic certain attributes of natural intelligence such as cognitive problem solving, without limitation or restriction), there is likewise no requirement that only a single instance or type of a given algorithm be used in the descriptions that follow. Algorithms may be untrained or trained using model data, external data, internal data, or other sources of data that may be used to improve the accuracy of calculations performed to generate output data for use in applications, systems, or platforms in data communication with software module or engine-based implementations.

Various approaches may implement machine learning neural networks, deep learning neural networks, artificial neural networks, convolution neural networks, recursive neural networks ("RNN"), long short-term memory ("LSTM"), and the like, and any of which may implement natural language processing ("NLP") and/or natural language model. Further, various examples described herein may implement generative artificial intelligence with natural language, generative pre-trained transformers ("GPT")™, large language models ("LLM"), and the like. Also, agent programs that accept and transmits data in natural language, such as a natural language chatbot, may be used to interoperate with the above-described approaches, including ChatGPT™ of OpenAI™ of San Francisco, CA, as well as others.

The described techniques within this Detailed Description are not limited in implementation, design, function, operation, structure, configuration, specification, or other aspects and may be varied without limitation. The size, shape, quantity, configuration, function, or structure of the elements shown in the various drawings may be varied and are not limited to any specific implementations shown, which are provided for exemplary purposes of illustration and are not intended to be limiting.

FIG. 1 illustrates an example of a functional block diagram configured to generate a list of manufacturers suitable to comply with manufacturing requirements to manufacture a physical structure, according to some examples. Diagram 100 depicts a function block diagram, which may be implemented as a system or a process, or any combination or portion thereof. Functional blocks of diagram 100 may be implemented in hardware or software, or a combination thereof. As shown, a user input 136 generates input data 138 that may be optionally combined with a prompt 162 in a query 160 to a large language model ("LLM") 170 to generate a list of manufacturers, such as small-to-medium manufacturers ("SMMs"). Further, diagram 100 includes an embedding model 140 configured to generate embeddings based on data inputs and a vector database 150 configured to store semantic vector embeddings as numeric values that serve to index content of proprietary and non-proprietary knowledge sources 152 associated with a domain of manufacturing. Diagram 100 also includes a summary generator 130 configured to generate engineering drawing summary data 132, a shoptype decision implementer 104 configured to evaluate selection data 102 to transmit a shoptype description 105, a part profile boundary estimator 110 configured to provide an estimated part size 116, and a manufacturing rules selector 120 configured to select and transmit estimated part size instruction data 122. Diagram 100 further includes a concatenation engine 132 configured to concatenate data inputs to form an automated text query 134.

In operation, user input 136 generates input data 138 that is received via an electronic network at a computing platform including one or more processors and one or more data stores (or memory). Input data 138 may represent requirements to manufacture a part or an item, as well as a physical structure that may include an assemblage of any number of parts. The term "part" may be used interchangeably with terms item and physical structure, and the like. Input data 138 may also include other data relating to manufacturing a part, such as a request for information regarding a manufacturer's certification (e.g., ISO-9001 compliance), a geographic location of a manufacturer, military specifications (e.g., "MIL SPECs"), and other information ancillary to a part specification or requirement. In some cases, input data 138 may be expressed in a natural language that may include strings of text and/or alpha-numeric characters in one or more sentences, paragraphs, or electronic documents. Embedding model 140 is configured to generate one or more input data vectors 146 to represent input data 138 as numeric values (that preserve a semantic meaning of input data 138.

User input data 138 may include a digitized copy of an engineering drawing depicting a physical structure associated with data representing requirements to manufacture a part (or physical structure), whereby the digitized copy of the engineering drawing a second user input may be associated with the above-described user input data 138, as a first user input. To process one or more of a first and a second user inputs, embedding model 140 may be a multimodal embedding model that is capable of interpreting both graphic (e.g., image data) and associated textual information (e.g., text or alpha-numeric data). To process a query 160 that includes both first and second user inputs of input data 138 the LLM 170 may be a Visual Language Model ("VLM") capable of interpreting both images and text associated with one or more user inputs. In some examples, a first user input may include text or alpha-numeric input and a second user input may include a digitized copy of a physical 2D engineering drawing, from which derived text data and derived image data may be extracted by using, for example, a visual language model ("VLM").

In some cases, a digitized copy of an engineering drawing may be a digitized copy of a physical 2D engineering drawing (e.g., originally drawn on paper), whereby the physical 2D engineering drawing may depict physical dimensions of a part, materials, and other manufacturing requirements. Further, part profile boundary estimator 110 may receive derived components of a physical 2D engineering, such as derived text data 114 as derived text including alpha-numeric characters and derived image data 112 as derived image-based profile attributes describing an outer envelope profile (or a bounding box) of a part, which may be sized or dimensioned (or substantially sized or dimensioned) by using derived text data and/or derived image data. An outer envelope or bounding box (e.g., a rectangle in 2D or a rectangular solid in 3D), may be a geometric shape enclosing or surrounding a part or an object in an image derived from an engineering drawing. Note that in some examples, user input 136 may include a 2D engineering drawing generated by a 3D CAD software program. Derived text data 114 and derived image data 112 may be derived from an engineering drawing generated originally as a 3D CAD model. In some cases, a 3D CAD model may be converted into a 2D engineering drawing from which text and image-based information (e.g., image-based profile attributes) may be derived. Derived text may be derived, for example, using optical character recognition ("OCR") technologies, image capturing technologies, computer vision technologies, or any other technology that may identify and extract alpha-numeric characters and symbols, as well as any other optically identifiable feature. In various examples, the terms "derived" and "extracted" may be interchangeable and are synonymous, unless otherwise indicated.

Summary generator 130 may generate engineering drawing summary data 132 as a function of extracted text or derived text data 114 from a 2D engineering drawing (i.e., either from an original or as derived from a 3D CAD model), whereby derived text may include text describing dimensions, shape of a part, materials, manufacturing processes (e.g., grinding or finishing), assembly information, or any other information. While not shown, and is described hereinafter, derived text may be automatically applied to an agent program directed to a manufacturing domain. An agent program may include a prompt to guide summary results based on engineering drawings and is included with derived text as input to a large language model, such as LLM 170 (or any other LLM). The returned summary results, as engineering drawing summary data 132, may be in a natural language. In some examples, an agent program may be configured as a customized or manufacturing-specific agent program (e.g., based, in part, on prompts relating to manufacturing). At least in one example, an agent program may be a manufacturing-specific large language model ("LLM") chatbot.

Shoptype decision implementer 104 may be configured to receive selection data 102 as an input to determine shoptype description data 105. While not shown, and is described hereinafter, derived text (e.g., derived text relevant to determining a shoptype) may be automatically applied to a shoptype classifier that receives semantic vectors including numeric values associated with the semantic meaning of at least a subset of derived text. In some examples, a shoptype classifier may be configured to classify derived text to determine whether semantic vectors may be classified as being relevant to one (or a few) shoptype rather than other shoptypes. In at least one case, a shoptype classifier may be configured to access a large language model with an optional agent program to derive classifications of shoptype (ranging from the most relevant shoptype to the least relevant shoptype). In other cases, a shoptype classifier may be configured to access any source of data, such as knowledge sources 152, LLMs other than LLM 170, any machine learning or deep learning neural networks, as well as other suitable sources of data. A shoptype classifier may be any process that may be configured to classify text associated with manufacturing. For example, a shoptype classifier may be a text classifier configured to implement natural language processing ("NLP") including, but not limited to, implementing name entity recognition ("NER") that aims at identifying and classifying entities or objects in an amount of text. In at least one example, shoptype decision implementer 104 may be configured as a shoptype LLM or a portion thereof (e.g., See, e.g., FIG. 5).

As user herein, the term "shoptype" refers to a type of a manufacturer or "shop," including machine shops, tool and die shops, metal shops, CNC machining shops, grinding shops, or any shop, manufacture, entity, or organization that provides services to form, create, build, assemble, or otherwise produce manufactured parts or physical structures in accordance with a user's or a buyer's specifications and requirements. For example, shoptypes may include entities that facilitate additive manufacturing, fabrication, forging, foundry services (e.g., castings), injection molding, machining, electronics, heat treatment services, coatings, and finishing, grinding, precision cutting, sheet metal fabrication, tooling, formation of replacement parts, and the like. Each shoptype may be associated with a specific subset of services regarding types of part material and manufacturing processes. As used herein, the term 'requirement' may refer to a characteristic of manufacturing a part in terms of manufacturing processes and the quality thereof, type of materials, tolerances, precision of size and form, as well as manufacturing a part that must function in specific operational environments (e.g., relevant to extreme temperatures, corrosion resistance, or operational in aerospace environments, for example), or any other factor that influences the quality of a manufactured part to meet a user's or a buyer's specifications.

A shoptype classifier may generate selection data 102 representing the most relevant shoptype (or most relevant shoptypes). For example, selection data 102 may include a specific shoptype, such as a machine shop, having a highest ranking or exceeding a minimum threshold indicating a most relevant shoptype. In some cases, selection data 102 includes a probability that a certain shoptype is the most relevant, or in other cases a probability is assigned to each shoptype with which shoptype decision implementer 104 is configured to evaluate, decide, and implement to decide a shoptype. In a case in which shoptype decision implementer 104 selects one or more shoptypes, corresponding shoptype description data 105 is generated in a natural language. A specific shoptype and related information, such as manufacturing capabilities, materials, processes, etc., may be included in shoptype description data 105. A selected shoptype may be transmitted as shoptype 106 to manufacturing rules selector 120.

As described above, part profile boundary estimator 110 may be configured to receive derived image data 112 as derived image-based profile attributes and derived text data 114 as derived text data of a 2D engineering drawing, whereas, in at least some cases, derived image data 112 and derived text data 114 may include data relating to a size of a part and may exclude other non-dimension related image or text data (e.g., regarding materials, assembly, etc.) Part profile boundary estimator 110 is configured to determine dimensions or a size of a part. In cases that a part is manufacturable in multiple sizes, part profile boundary estimator 110 may determine dimensions or sizes for each of the part sizes. Part profile boundary estimator 110 generates estimated part size 116 for one or more sizes for a part and transmits estimated part size 116 to manufacturing rules selector 120.

Manufacturing rules selector 120 includes any number of rules for manufacturing a part for each shoptype including rules regarding manufacturing processes, materials, etc., any of which may be linked to manufacturability of a part of certain sizes. For example, for each shoptype there may be a statistical distribution of the minimum and maximum size of a manufactured item that each SMM may accommodate. For example, in context of machining a part there will be many SMMs that can manufacture a barrel of a rifle. But there may be fewer SMMs that have large machinery (or other manufacturing capabilities) necessary to manufacture a barrel for a cannon (e.g., larger bore or artillery cannons, such as a as an M198 Howitzer with a caliber of 155 mm, or the like). Similarly, while many SMMs can manufacture a barrel of a rifle, some SMMs may not be able to manufacture smaller pins and trigger components of a rifle that typically require specialized equipment.

As shown, manufacturing rules selector 120 receives data representing a shoptype 106 and estimated part size 116. For the example case of a shoptype associated with machining, a manufacturing rules selector 120 may include rules developed by experts in machining such as by expert machinists, expert mechanical engineers, expert persons in the tool and die industry, etc., that declare a range of minimum and maximum sizes that machining shops can accommodate. When a size of a manufactured item (i.e., an item or part to be manufactured) is outside a range of sizes, manufacturing rules selector 120 may generate natural language estimated part size instruction data 122 instructing a system or a computing platform described herein to search for the less common SMMs that have an appropriate size capability. Estimated part size instruction data 122 are transmitted to concatenation engine 132, and thus may be included in a query to LLM 170. In some examples, rules developed by experts (e.g., persons with specialized knowledge) for each shoptype may cover attributes other than size, which may expand a search for other or uncommon capabilities of manufacturers associated with a shoptype. Such rules may be embodied in manufacturing rule data.

Embedding model 140 is shown configured to generate an automated text query vector 148 to represent a meaning of automated text query 134 as generated by concatenation engine 132. Automated text query 134 is formed by concatenating at least two (or three or more) of engineering drawing summary data, a shoptype description data, and estimated part size instruction data to combine the at least two (or three or more) of engineering drawing summary data 132, shoptype description data 105, and estimated part size instruction data 122, all of which may be expressed in a natural language. As such, automated text query 134 may be expressed in a natural language.

Notably, automated text query 134 may include a combination of text including a summary of text relevant to a shoptype based on text derived from an engineering drawing (e.g., engineering drawing summary data 132), text describing a selected shoptype and related information (e.g., shoptype description data 105), and text describing a size, profile, or volume applicable to one or more part sizes (e.g., estimated part size instruction data 122). In combination, automated text query 134 provides increased amounts of information regarding a part and selection of a shoptype to enhance the accuracy of matching part specification to a subset of qualified manufacturers.

In some examples retrieval-augmented generation "(RAG")", as described herein, embedding model 140 may be configured to encode knowledge source(s) 152 into knowledge source vectors 147, which may be stored in vector database 150 with pointers to the corresponding knowledge source(s) 152. During user operation, embedding model 140 encodes input data 138 to form input data vector 146 and embedding model 140 may also be configured to encode automated text query 134 to form automated text query vector 148. Note, while vectors 146 and 148 are shown as two vectors, input data 138 and automated text query 134 may be combined and embedded as a single vector, at least in some cases.

In some examples, vectors 146 and 148 may be compared to knowledge source vectors 147 stored in vector database 150 as a function of, for example, a cosine similarity, as a measure of meaning (other measures of vector similarity may also be used). Pointers associated with knowledge source vectors 147 may be computed to be relatively similar to vectors 146 and 148 and may be used to retrieve a portion of knowledge sources 152 to include as an input into LLM 170, which generates a response including data representing a list 180 of suitable entities or manufacturers. List 180 may include, for example, the top three (or any number) of most relevant manufacturers based on similarities between input data 138 and/or automated text query 134 and information about SMMs associated with knowledge sources 152. As such, list 180 may include manufacturers that are ranked favorably. Note that list 180 need not be limited to manufacturers but may include a list of service providers in any domain or business space. Thus, the functionality described in diagram 100 may be applicable to finding any service provider that may be applicable to a user input and relevant documentary input. In some examples, data representing list 180 may be stored in memory or may be transient.

In some examples, list 180 may include a list of qualified small-to-medium manufacturers ("SMMs"). An SMM may refer to manufacturers, entities, firms, organizations, etc., that employ less than a certain number of employees in a non-subsidiary and independent organization. Typically, the term SMM refers to a manufacturer that employs 500 or fewer employees. See, for example, 42 U.S. Code § 17116 (6). Note that list 180 need not be limited to SMMs.

Diagram 100 also depicts a query 160 that may include input data 138 and a prompt 162 to guide the result of LLM 170. For example, prompt 162 may include a phrase "search within a domain of manufacturing that includes small-to-medium manufacturers." For example, if a user (e.g., a buyer skilled or knowledgeable about manufacturing) requires more or precise information than automatically generated list 180, then the user may engage in subsequent conversational dialog with LLM 170 using a chatbot or an LLM agent by providing additional user feedback 137 such as information regarding a manufacturer's certification, a material (e.g., Austenitic stainless steel), a geographic location of a manufacturer, and other information ancillary to a part requirement. The subsequent dialog may be considered to be one or more prompts analogous to prompt 162 in of query 160. Subsequent dialog may occur with or without automated text query 134, which may be generated automatically relating to parts information.

User input 136 may generate input data 138 in a natural language that is augmented by prompt 162. In some additional examples of prompt 162, input data 138 may be an input into a manufacturing-specific agent program or chatbot (e.g., an LLM chatbot). For example, prompt 162 may inject text to direct to "search a propriety SMM database in knowledge sources 152 and a public data source (e.g., World-Wide Web) with results directed to small-to-medium manufacturers that align with input data 138." Input data 138 may first describe in text "I prefer manufacturers that can (1) manufacture with stainless steel, (2) provide ISO-9001 certification, and (3) manufacture a part for user in the defense sector, such as in a military application whereby a part is to be manufactured to 'MIL-SPEC' technical requirements (i.e., military specifications)." Second, input data 138 may request that "each manufacturer is a machine shop that can machine parts to precise tolerances and to buyer specification." Also, a user may specify that certain "machining processes, such as drilling, EDM, milling, and other equivalent capabilities are preferred." A user may or may not provide an engineering drawing to be summarized by summary generator 130 in engineering drawing summary data 132, which may be a component of automated text query 134 to enhance the results of list 180. If LLM 170 is a Visual Language Model ("VLM") capable of interpreting both images and text associated with them, input data 138 may also include as a second user input including an engineering drawing or extracted parts of an engineering drawing (e.g., derived image data).

In some examples, LLM 170 may be enhanced by RAG in the manner described herein, whereby the interaction among user input 136, user feedback 137, and LLM 170 may be considered to constitute a manufacturing-specific LLM chatbot, which may provide list 180 to a user as a hierarchical or ranked listing 180 of small-to-medium manufacturers. List 180 may specify:

Manufacturer A is ISO-9001 certified and registered and is compliant with MIL-STD-130 and FED-STD-595. Manufacturer A states that they provide high-quality production services.

Manufacturer B has experience in quality materials for use in military applications, such as military hardware and equipment. Manufacturer B works with common metals for military applications including Aluminum, Stainless Steel, and Nickel alloys.

Manufacturer C provides Austenitic stainless steel grades as non-magnetic that meets military specifications for a variety of military applications. Grades 304, 316, and 321 provide excellent corrosion resistance.

Optionally, a manufacturing-specific LLM chatbot may provide a summary of list 180 as follows: "Manufacturers A, B, and C have experience with various machining processes and materials, including stainless steel and at least one manufacturer complies with ISO-9001 certification standards. Manufacturers A, B, and C have experience with military applications. You ought to contact each of these manufacturers to confirm that they can meet your manufacturing requirements."

In response, user feedback 137 may include text requesting clarifying of the selection included in list 180. An example of response may be "Manufacturer A complies with your material requirement (e.g., stainless steel), and is ISO-9001 certified, has experience in military applications. While Manufacturer A does not specify capabilities in machining processes, with their experience with stainless steel, they may have experience in machining processes."

To conclude this example, additional user feedback 137 may direct that the clarifying response be forwarded to Manufacturer A with a request for quotation ("RFQ") to manufacture the part as this manufacturer is ranked higher than other SMMs that were considered.

In some examples, functional blocks of diagram 100 may implement retrieval-augmented generation, or "RAG," by configuring a prompt for a manufacturing-specific LLM chatbot to implement a proprietary database (e.g., a small-to-medium manufacturing database) in knowledge sources 152. See, for example, FIGS. 5 and 9. RAG may be implemented to provide results from, and citations to, authoritative knowledge sources. As such, results in list 180 are more likely to be accurate, dependable, and current. Also, with a RAG implementation, the results in list 180 can be validated more readily. RAG also may decrease instances of incorrect or misleading (e.g., "hallucinations") in results shown in list 180. Further, a manufacturing-specific LLM chatbot may be configured to access an "expert knowledge database" in knowledge sources 152 to enhance accuracy and dependability of results in list of manufacturers 180 in a RAG implementation. See, for example, FIGS. 5 and 9. An expert knowledge database may include data and documents that, among other things, represent expert knowledge derived from skilled machinists, skilled mechanical engineers, skilled material engineers, and other skilled persons in a manufacturing domain.

Examples depicted in diagram 100 refer to a "large language model," which may be based on neural networks. The term "large" language model is well-known in the art and those ordinarily skilled in the art (e.g., data scientists, computer scientists, software developers, etc.) understand the term "large" in context of AI, including generative artificial intelligence, as the term is an industry-wide term similar to the term "cloud" when referring to networks and networked computer platforms. An LLM may be referred to as a type of "deep learning" model including neural networks that can be trained on a large dataset to perform operations in natural language. As an LLM is trained, an LLM "learns" patterns of text and concepts as well as relationships in a natural language to predict a "next word" of output based on a current or previous input where the input may be directed to manufacturing.

While LLM 170 is described in diagram 100, other AI models may be implemented to perform the functionalities described in FIG. 1, such as generative artificial intelligence ("generative AI") with natural language, generative pre-trained transformers ("GPT")™, machine-learning neural networks, deep learning neural networks, and equivalents thereof. LLM 170 may be implemented using one or more LLMs, such as Llama™ (Large Language Model Meta AI) maintained by Meta AI, which is a subsidiary of Meta Platforms, Inc. d/b/a Meta of Menlo Park, CA. LLM 170 may be implemented using GPT-3 or GPT-4, or variants thereof, which are maintained by OpenAI™ of San Francisco, CA. LLM 170 may be implemented using one or more of Gemini™ LLMs, which are maintained by Google DeepMind™ as a subsidiary of Alphabet, Inc. of Mountain View, CA. LLM 170 may be implemented using an Azure OpenAI™ LLM (or other LLMs) maintained by Microsoft, Inc., of Redmond WA. LLM 170 may be implemented using one or more of LLMs developed by Cohere™ of Toronto, Ontario. LLM 170 may be implemented using a wide variety of LLMs.

One or more functional blocks in diagram 100 may be implemented as, or may be associated with, software, applications, executable code, endpoints, or application programming interfaces ("APIs"), processors, hardware, firmware, circuitry, or any combination thereof.

Figure 2:
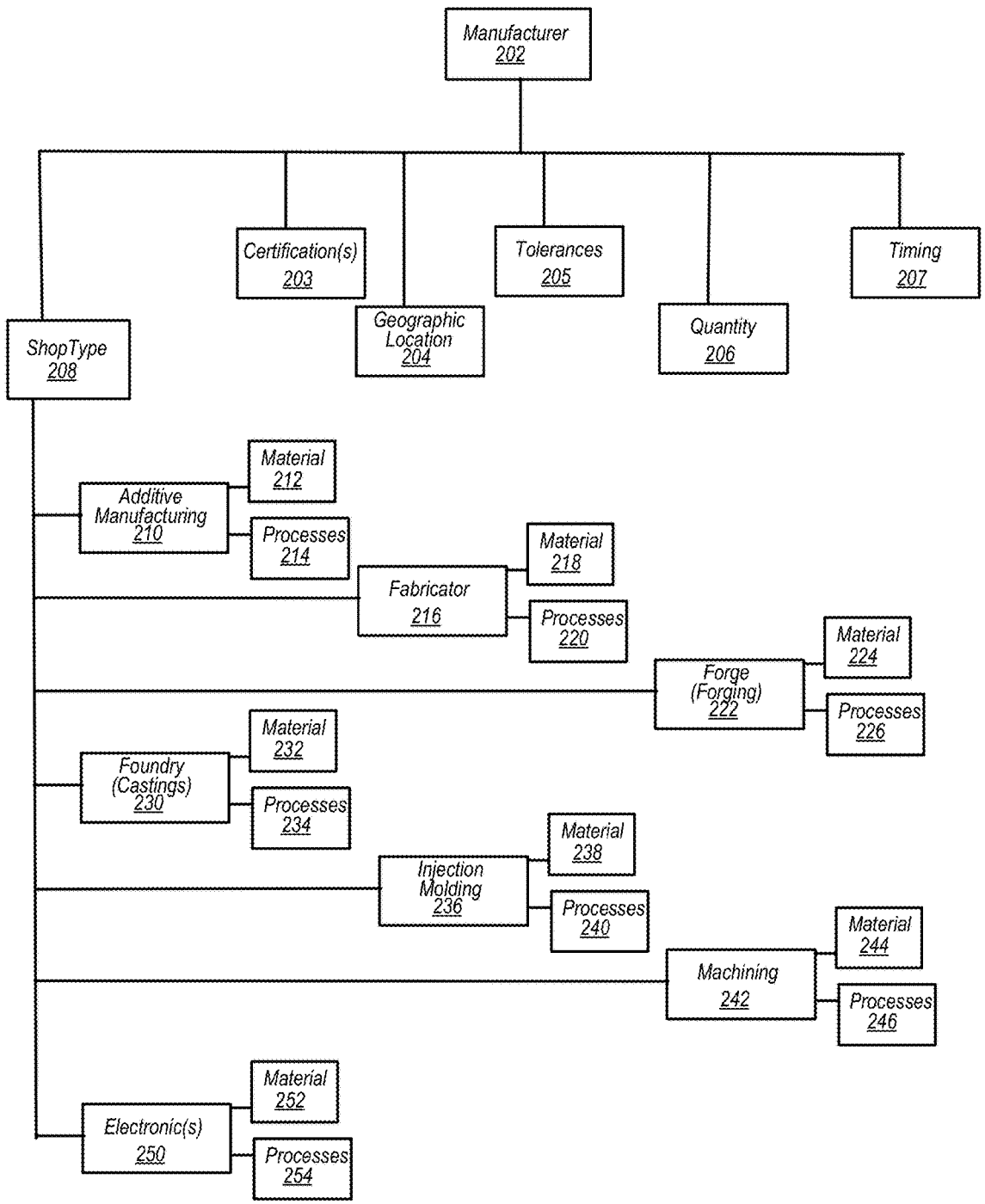
FIG. 2 illustrates an example of attribute relationships as an instance of a manufacturer, according to some examples.

FIG. 2 illustrates an example of attribute relationships as an instance of a manufacturer, according to some examples. Diagram 200 depicts a manufacturer 202 associated with a variety of attributes or characteristics. Natural language queries directed to an LLM regarding requirements to manufacture a part may include words, phrases, sentences, etc., that relate to any of the attributes of manufacturer 202. Thus, similarities between text in a query and text embedded in a vector database may be classified as being related to one of these attributes. As shown, manufacturer 202 may be characterized in terms of shoptype 208, certifications 203, geographic location 204, tolerances 205, quantity 206 (of parts requested), timing 207, and other attributes not shown. While shown regarding shoptype 208, other attributes of manufacturer may be linked to each other. For example, a shoptype may be linked to a material and a manufacturing process, among other things.

In this example, shoptype 208 may be one or more of the seven (7) shop types shown. A first shoptype 208 may be classified as additive manufacturing 210 and may include descriptions (e.g., shoptype descriptions 105 of FIG. 1) of materials 212 and processes 214 that are associated with shoptype 208. Processes 214 may refer to, for example, Binder Jetting, Direct Energy Deposition, Direct Metal Laser Sintering, Fixed Deposit Modeling ("FDM")™, PolyJet™ Selective Laser Sintering ("SLS")™, Sheet Lamination, Stereolithography ("SLA")™, as well as any other equivalent additive manufacturing process. Material 212 may describe metals and plastics, and varieties thereof.

A second shoptype 208 may be classified as fabricator 216, which may be associated with descriptions relating to material 218 and processes 220. Processes 220 may refer, for example, to Bending, Drawing, Forming, Hydroforming, Laser Cutting, Plasma Cutting, Punching, Rolling, Shearing, Sheet Metal, Stamping, Waterjet Cutting, Welding, as well as any other equivalent fabrication process to form and/or join materials in a manufacturing process. A third shoptype 208 may be classified as a forge 222 that provides forging manufacturing services. Forge 222 may be associated with descriptions relating to material 224 and processes 226. Processes 226 may refer, for example, to Cold Forging, Impression Die Forging (e.g., Closed Die Forging), Open Die Forging, Seamless Rolled Ring Forging, as well as any other equivalent forging process. A fourth shoptype 208 may be classified as a foundry 230 that provides casting manufacturing services. Foundry 230 may be associated with descriptions relating to material 232 and processes 234. Processes 234 may refer, for example, to Centrifugal Casting, Continuous Casting, Die Casting, Gravity Die Casting, Investment Casting, Lost-Foam Casting, Low-Pressure Casting, Permanent Mold Casting, Plaster Casting, Pressure Die Casting, Sand Casting, Shell Molding, Squeeze Die Casting, Vacuum Casting, as well as any other equivalent casting process.

A fifth shoptype 208 may be classified as injection molding manufacturing services. Injection molding 236 may be associated with descriptions relating to material 238 and processes 240. Processes 240 may refer, for example, to Gas-Assisted Injection Molding, Liquid Silicone Injection Molding, Metal Injection Molding, Structural Foam Molding, Thin-Wall Molding, as well as any other equivalent injection molding process. Material 238 may describe metals and plastics, and varieties thereof. A sixth shoptype 208 may be classified as machining 242 as a manufacturing service. Machining 242 may be associated with descriptions relating to material 244 and processes 246. Processes 246 may refer, for example, to Boring, Broaching, Drilling, Electrochemical machining ("ECM"), Electrical discharge machining ("EDM"), Grinding, Hobbing, Milling, as well as any other equivalent machining process. A seventh shoptype 208 may be classified as providing electronics or electrical devices as well as electronics services 250. Electronics 250 may be associated with descriptions relating to material 252 and processes 254. Materials 252 may refer, for example, to Battery Packs, Cables, Electronic Box Builds, Printed Circuit Boards, Wiring Harnesses, as well as any other electronics or electrically-related products or materials.

Figure 3:
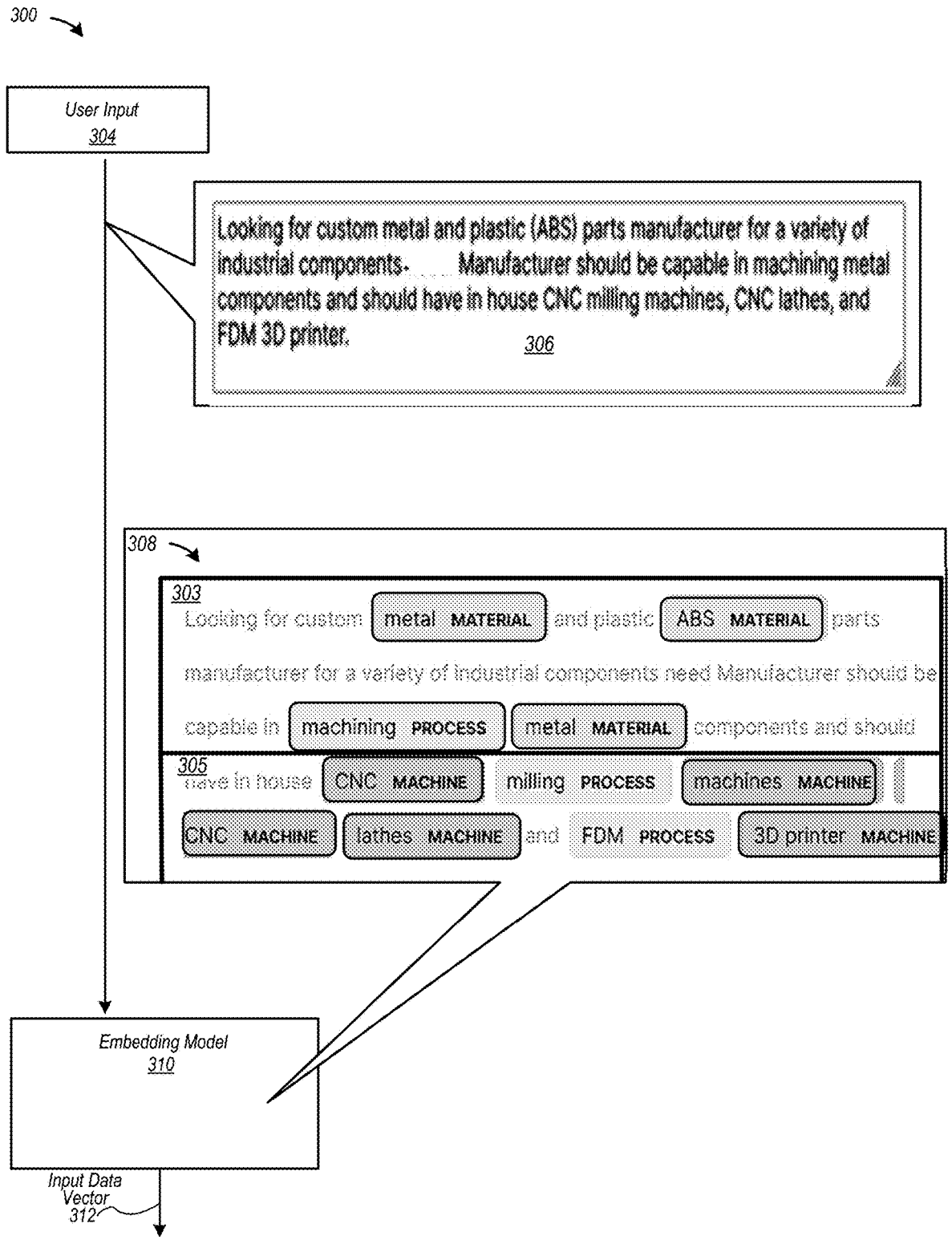
FIG. 3 is an example of a natural language query processed by an embedding model, according to some examples.

FIG. 3 is an example of a natural language query processed by an embedding model, according to some examples. Diagram 300 depicts a user input 304 including a request 306 for a metal and plastic parts manufacturer. Request 306 may be entered into, for example, an LLM chatbot, as input data 138 of FIG. 1. Referring back to FIG. 3, request 306 is passed as request 308 to an embedding model 310 to generate embeddings to form an input vector 312. In this example, embedding model 310 divides request 308 into smaller segments in, for example, a "chunking" process for LLM-related applications. As shown, request 308 is shown divided into a first chunk 303 and a second chunk 305. Chunks 303 and 305 each become a unit of text assigned an identifier for vectorization and storage in a vector database. The sizes of chunks 303 and 305 are for illustrative purposes and can be of any size that preserves sufficient context and reduces "hallucinations." In some examples, a chunking process may be used in retrieval-augmented generation "RAG" in LLM implementations.

Figure 4:
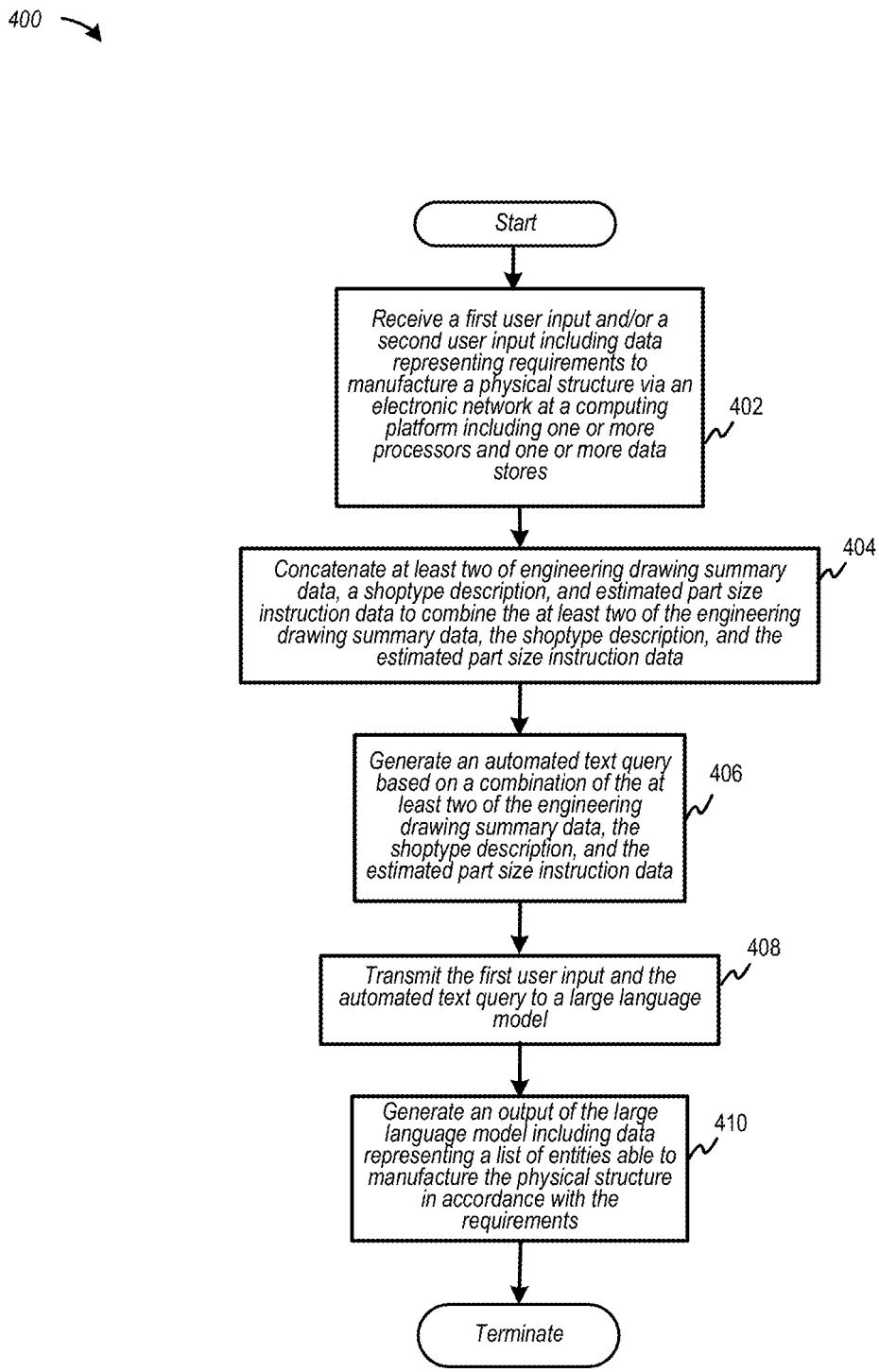
FIG. 4 is a flow diagram depicting an example of a flow for generating a manufacturing-related query based on a user input and derived data from a source associated with the user input, according to some examples.

FIG. 4 is a flow diagram depicting an example of a flow for generating a manufacturing-related query based on a user input and derived data from a source associated with the user input, according to some examples. Flow 400 is an example of generating a list of qualified entities or manufacturers based on a user input and derived data from a source associated with the user input. For example, a user input may initiate a textual query to an LLM (or any other equivalent AI neural network that can process and produce natural language text). Derived data from a source associated with the user input may be integrated uniquely with a user input to improve accuracy and reliability of determining a list of qualified manufacturers. The source may be an engineering drawing. For example, derived data may include derived text data (e.g., derived text data 114 of FIG. 1) and derived image data (e.g., derived image 112 of FIG. 1) from an engineering drawing associated with the user and/or requirements for manufacturing a part, as described in FIG. 1 and elsewhere herein.

At 402, a first user input and/or a second user input including data representing requirements to manufacture a physical structure, as well as a part or an item, may be received via an electronic network at a computing platform that includes one or more processors and one or more data stores. In some examples, a first user input may include one or more inquiries entered into, for example, an LLM chatbot to determine whether a manufacturer is capable to manufacture a part in accordance with the user's specification and part requirements. In some cases, a first user input is in a natural language including strings of one or more of text that may include alpha-numeric characters, whereby the strings may include one or more words, phrases, sentences, paragraphs, and documents. In some examples, a first user input may include text or alpha-numeric input and a second user input may include a digitized copy of a physical 2D engineering drawing from which may be derived text data and derived image data using, for example, a visual language model ("VLM"). Alternatively, a second user input independent of a first user input may include a digitized copy of a physical 2D engineering drawing may be configured to convey part requirements for manufacturing, including dimensions (e.g., part sizes) and optionally materials and machining (or manufacturing process) requirements automatically and, in some cases, without manual or human intervention to generate a part specification.

In some examples, a second user input associated with data representing requirements to manufacture a physical structure may be received. The second user input may be a digitized copy of a 2D engineering drawing depicting a physical structure with accompanying dimensions, material requirements, and other manufacturing requirements. In some examples, a second user input may be made available to a system or process configured to provide additional information to select a manufacturer aligned with requirements specified in a query in a first user input. That is, a 2D engineering drawing may be introduced into a system or process configured to analyze a 2D engineering drawing to derive text and derive image-related information (e.g., relating to a profile or outer envelope of a part). In at least one example, a second user input may include data received into a manufacturing-specific LLM agent or chatbot, which may include using a VLM model capable of deriving or interpreting components of an engineering drawing (e.g., components of a scanned 2D engineering drawing), including text and image features.

Derived components of a 2D engineering drawing can include derived text (as alpha-numeric characters) and derived image data, such as image-related profile attributes that may describe an outer envelope or a boundary box to determine a size of a part. Also, selection data to generate a shoptype description data and a shoptype may be analyzed to determine a shop description, which may be concatenated to form an automated text query. The selection data may be based on derived text from a digitized copy of a 2D engineering drawing.

Further, rules may be applied to a shoptype based on an estimated size of a physical structure, whereby rules may be applied at, for example, a manufacturing rules selector 120 of FIG. 1. Application of the rules generate estimated part size instruction data indicating an opportunity to search for other capabilities of a manufacturer of a certain shoptype.

At 404, at least two of engineering drawing summary data, a shoptype description data, and estimated part size instruction data can be concatenated to combine the at least two of engineering drawing summary data, shoptype description data, and estimated part size instruction data.

At 406, an automated text query may be generated based on a combination of at least two of an engineering drawing summary data, a shoptype description data, and estimated part size instruction data. At 408, a first user input and an automated text query may be transmitted to a large language model ("LLM"). At 410, an output of a large language model may generate or output results as data representing a list of entities able or are qualified to manufacture a physical structure in accordance with requirements for manufacturing a physical structure or part.

Figure 5:
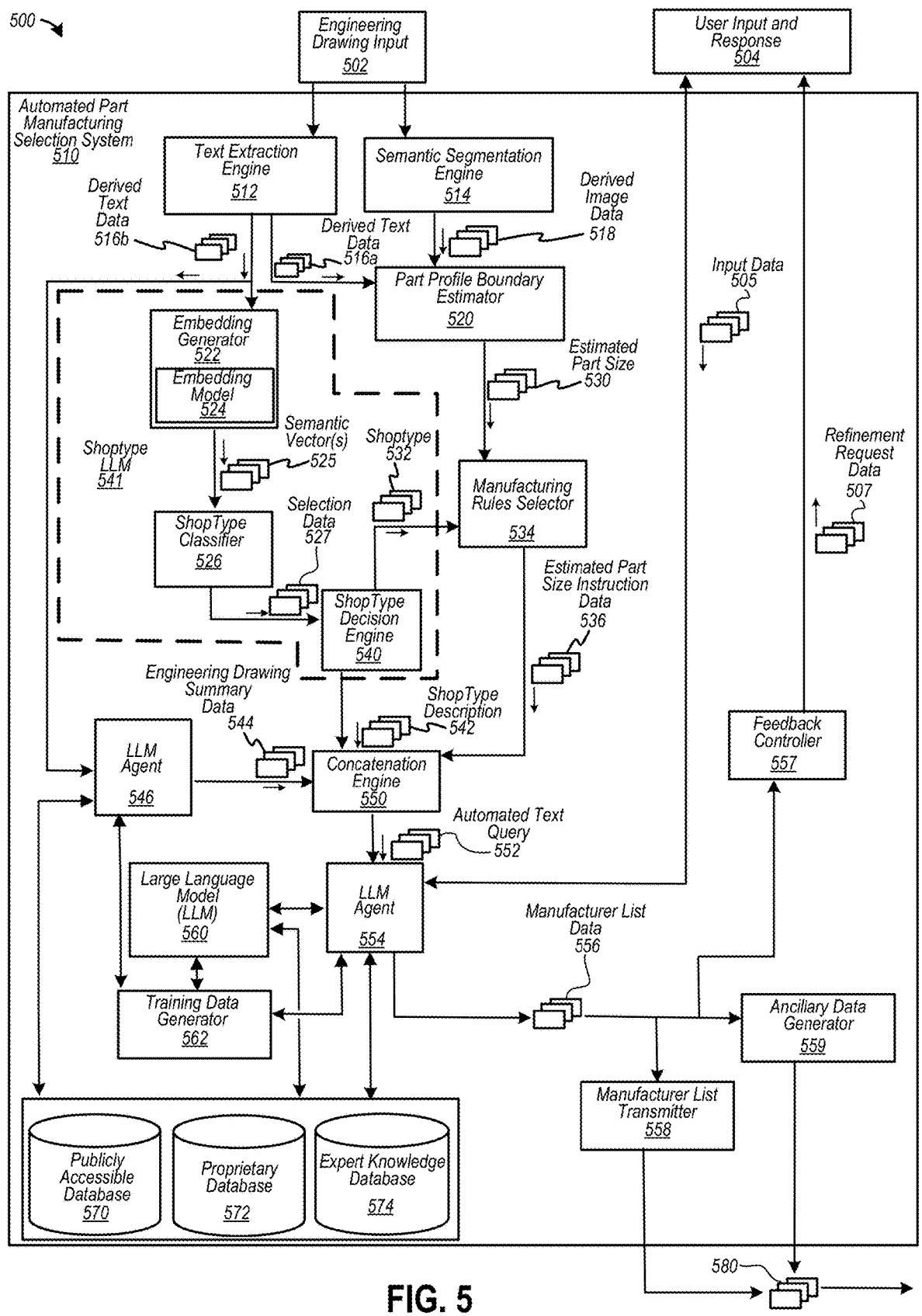
FIG. 5 illustrates an example of an automated system with which requirements to manufacture parts are implemented to select a subset of qualified manufacturers, according to some examples.

FIG. 5 illustrates an example of an automated system with which requirements to manufacture parts are implemented to select a subset of qualified manufacturers, according to some examples. Diagram 500 depicts an automated part manufacturing selection system 510 configured to receive user input 504 and an engineering drawing input 502 with which to generate a manufacture list 556 that includes a subset of manufacturers that are compatible and relevant to manufacture a part in accordance with requirements of a part and specifications of a user or a buyer.

Automated part manufacturing selection system 510 may function, at least in some cases, equivalent to functional blocks described in FIG. 1, according to some embodiments. Notably, automated part manufacturing selection system 510 includes equivalent functionalities described in FIG. 1. For example, LLM agent 546 of FIG. 5 may operate equivalent to summary generator 130 of FIG. 1, LLM 560 of FIG. 5 may operate equivalent to LLM 170 of FIG. 1, shoptype classifier 526 of FIG. 5 may be configured to generate selection data 527 equivalent to a classifier configured to generate selection data 102 of FIG. 1, shoptype decision engine 540 of FIG. 5 may operate equivalent to shoptype decision implementer 104 of FIG. 1, part profile boundary estimator 520 of FIG. 5 may operate equivalent to part profile boundary estimator 110 of FIG. 1, manufacturing rules selector 534 may operate equivalent to manufacturing rules selector 120 of FIG. 1, concatenation engine 550 of FIG. 5 may operate equivalent to concatenation engine 132 of FIG. 1, at least proprietary database 572 and expert knowledge database 574 may operate equivalent to knowledge sources 152 of FIG. 1, and LLM agent 554 may operate equivalent to the functionality described in FIG. 1 to query an LLM. In some examples, each of the above-described components need not operate equivalently and may operate independently.

Diagram 500 includes a text extraction engine 512 and a semantic segmentation engine 514 to correspondingly derive text and image-related information from an engineering drawing, such as a 2D engineering drawing. Text extraction engine 512 may implement any character or text recognition technologies. For example, text extraction engine 512 may implement optical character recognition ("OCR") technologies, image capturing technologies, computer vision technologies, or any other technology that may identify and extract alpha-numeric characters and symbols, as well as any other optically identifiable feature.

As an example, text extraction engine 512 may be configured to derive text relating to spatial dimensions of a part depicted in a 2D engineering drawing. For example, text extraction engine 512 may be configured to derive dimensions relating to one or more of the following: references to numerical or variable dimensions as depicted relative to a part, dimensions described in design or description tables, units of dimension, etc. As shown in diagram 500, derived spatial dimension information, as a first subset 516a of derived test (derived text data 516a), may be provided to part profile boundary estimator 520 to facilitate estimation of a part size based on derived text data 516.

Further, text extraction engine 512 may be configured to derive textual information relevant to determine a shoptype, as a second subset of derived text (derived text data 516b), such as a type of material (e.g., AL alloy), a manufacturing standard or certification (whether a part complies with QQ-A-250/30 T851 as an aerospace aluminum alloy), an identifier of a part, buyer and vendor information, application information, engineering notes, safety notes, a parts list, an assembly description, etc. Derived text data 516b may be relevant in determining a shoptype and can be provided to embedding generator 522 and LLM agent 546.

Embedding generator 522 is configured to receive derived text data 516b and includes logic configured to generate embeddings as function of derived text data 516b. Embedding generator 522 includes an embedding model 524, which may be any embedding model configured to transform derived text data 516b into vectors (e.g., embedding vectors) compatible with an LLM model, such as LLM 560 or any other LLM. Embedding model 524 may be configured to convert a group of text (e.g., a chunk) into numerical values constituting one or more vectors. In at least one example, embedding model 524 may be equivalent to embedding model 140 of FIG. 1. Note that embedding model 524 may be any embedding model, such as an embedding model configured to vectorize derived text data 516b for use in natural language processing ("NLP") or in any other equivalent vectorization process. Embedding generator 522 generates and transmits semantic vectors 525 to shoptype classifier 526 automatically.

Shoptype classifier 526 may be a neural network configured to be trained to classify semantic vectors 525 that may be associated with derived text data 516b as being indicative of one (or a few) shoptype(s) rather than other shoptype classifications. In one example, training of shoptype classifier 526 may be performed with a dataset of drawings labeled by manufacturing experts or otherwise automatically generated to associate drawing labels to components of an engineering drawing. Shoptype classifier 526 may generate selection data 527 representing the most relevant shoptype (or a subset of most relevant shoptypes). For example, selection data 527 may include a specific shoptype, such as a tool and die shop, having a highest ranking or exceeding a minimum threshold indicating a most relevant shoptype. In some cases, selection data 527 includes a probability that a certain shoptype is the most relevant, or in other cases a probability is assigned to each shoptype in which shoptype decision engine 540 may determine a shoptype. In some examples, the functions of embedding generator 522, shoptype classifier 526, and shoptype decision engine 540 may be implemented as a shoptype LLM 541. Shoptype LLM 541 may include any capable LLM foundation model that may have been additionally trained with a set of examples data derived in association with shoptype description data 542 and related knowledge, such as data associated with expert knowledge database 574. In other examples, shoptype LLM 541 may be include any capable LLM foundation model that may be enhanced in accordance with RAG principles, as described herein, using a set of examples of shoptype description 542 and related knowledge such as expert knowledge database 574. Shoptype LLM 541 can be configured to receive derived text data 516b as input. In one example in which shoptype LLM 541 is a VLM, derived image data 518 and/or engineering drawing input 502 may be received as an input (e.g., a second input) Shoptype LLM 541 may be prompted with a command such as: "Which of the ShopTypes that you have learned are needed to make this part?Give a thorough description of each of those ShopTypes." The resulting shoptype data 523 may be transmitted to manufacturing rules selector 534 and as at least a portion of resulting shoptype description 542, which, in turn, may be transmitted to concatenation engine 550.

Derived text data 516*b* is also transmitted from text extraction engine 512 to LLM agent 546. In some examples, LLM agent 546 may be configured as a customized or manufacturing-specific agent program (e.g., by prompts, retrieval-augmented generation ("RAG") implementations, pretraining, or the like). At least in one example, a prompt configured for use by LLM agent 546 may configure LLM agent 546 as a manufacturing-specific large language model ("LLM") chatbot. For example, derived text data 516*b* may be input into LLM agent 546 with a prompt configured to generate a summary of derived text data 516*b*. For example, a prompt may issue a request to "Generate a summary of text: [ . . . derived text data 516*b* . . . ] in the context of small-to-medium manufacturing." LLM agent 546 in this case is a summary generator (e.g., similar to summary generator 130 of FIG. 1) and may generate engineering drawing summary data 544 as a function of text derived from a 2D engineering drawing (i.e., as based on derived text 516*b* from either a scanned original 2D engineering drawing or a 2D engineering drawing derived from a 3D CAD model), whereby derived text 516*b* may include text describing materials, manufacturing processes (e.g., grinding or finishing), assembly information, or any other information. The returned summary results, as engineering drawing summary data 544, may be in a natural language and is an enhanced description based on derived text data 516*b*. LLM agent 546 is configured to transmit engineering drawing summary data 544 to concatenation engine 550.

Semantic segmentation engine 514 is configured to receive engineering drawing input 502 and to extract or derive image components or image-related features describing dimensions or other spatial features of a part or physical structure as an object of an engineering drawing. In some examples, semantic segmentation engine 514 may be configured to derive images and image-related components or features via semantic segmentation in which, for example, one or more pixels in an image may be assigned a value or classification. A pixel may be aggregated in accordance with its classification to derive image features using, for example, an application or logic configured to implement a convolutional neural network ("CNN") or any other technique, such as using deep learning and other equivalent approaches congruous with computer vision ("CV") and other image and object detection techniques. Semantic segmentation engine 514 generates derived image data 518 including image-related data including, but not limited to, components or features constituting spatial features of a part or part, for example, dimensioned view of a part. Derived image data 518 may be transmitted to part profile boundary estimator 520.

Part profile boundary estimator 520 is configured to receive derived text 516*a* that may include data specifying datum references, numerical dimensions, variable dimensions, dimension units, dimensions derived from one or more tables, and other profile-related data. Part profile boundary estimator 520 is further configured to receive derived image data 518 that includes image-related components or features. Part profile boundary estimator 520 may be configured to determine dimensions of a profile of a part from one or more objects in an engineering drawing. A profile may refer to an aggregation of one or more dimensions depicted in an image as a "front view" or a "side view," and, in some examples, a profile may include a "whole item profile" and a "profile dimension." Part profile boundary estimator 520 is configured to determine external dimensions of a part or object in an engineering drawing to define an "outer" boundary or envelop in a space in a which a part or object displaces and not beyond, thereby establishing, for example, a "size" (e.g., in 2 or 3 dimensions) of a part or object. In some examples, internal dimensions may be analyzed as to whether an internal dimension may contribute to determining a size. Part profile boundary estimator 520 is configured to determine a size of a part and transmit an estimated part size 530 to manufacturing rules selector 534.

Manufacturing rules selector 534 is configured to receive estimated part size 530 and apply any number of rules for manufacturing a part for each shoptype, as well as rules regarding manufacturing processes, materials, etc., any of which may be linked to manufacturability of a part of certain sizes. Manufacturing rules (e.g., manufacturing rule data) for a specific shoptype and part size may be expressed in a natural language and specify that, for example, to manufacture a part, an SMM as a fabricator shoptype may be required to fabricate large assemblies typically for repairing or building ships. Another rule may be "to manufacture a relatively smaller part, and may state that "an SMM ought to be of a machining shoptype able to fabricate relatively smaller components typically implemented in triggering mechanisms of hand guns." In some examples, manufacturing rules selector 534 may include rules developed by experts in manufacturing, such as expert machinists, expert mechanical engineers, expert persons in the tool and die industry, etc., and thus may be referred to as "expert rules."

As shown, manufacturing rules selector 534 receives data representing a shoptype 532 and estimated part size 530. Manufacturing rules selector 534 may include logic to apply manufacturing rules for a shoptype based on an estimate size or size range, or any other rule requirement, as a function of shoptype 532 and estimated part size 530. In some cases, a part specification may require a range of one or more sizes. In this case, manufacturing rules selector 534 is configured to evaluate a range of sizes for a part specification in accordance with estimated part size instruction data 536, whereby estimated part size instruction data 536 includes information to determine whether a shoptype may be capable to manufacture a part in a range of sizes.

Shoptype decision engine 540 may be configured to receive selection data 527 as an input to determine shoptype description data 542. Selection data 527 may include a specific shoptype, such as a machine shop, having a highest ranking or exceeding a minimum threshold indicating a most relevant shoptype. In some cases, selection data 527 includes a probability that a certain shoptype is the most relevant, or in other cases a probability is assigned to each shoptype in which shoptype decision engine 540 may determine a shoptype. Based on selection data 527, shoptype decision engine 540 is configured to select a shoptype (e.g., additive manufacturing). Shoptype decision engine 540 transmits a shoptype 532 to manufacturing rules selector 534 to manufacturing rules selector 534, which, in turn, transmits estimated part size instruction data 536 to concatenation engine 550. Shoptype decision engine 540 may be further configured to generate and transmit shoptype description 542 to concatenation engine 550. As an example, if the shoptype is "injection molding," an accompanying description may be included in shoptype description 542. For example, for injection molding, a portion of an accompanying description may be as follows: "gas-assisted injection molding, liquid silicone injection molding, metal injection molding, structural foam molding, and thin-wall molding," as well as any other equivalent injection molding process descriptions. Other associated descriptions may also be included.

Concatenation engine 550 is configured to receive engineering drawing summary data 544, shoptype description data 542, and estimated part size instruction data 536, each of which may be expressed in a natural language directed to manufacturing. Further, concatenation engine 550 is configured to concatenate at least two (or three or more) of engineering drawing summary data, a shoptype description data, and estimated part size instruction data to combine the at least two (or three or more) of engineering drawing summary data 544, shoptype description data 542, and estimated part size instruction data 536, all of which may be expressed in a natural language. Concatenation engine 550 is further configured to generate an automated text query 552 that includes a combination of text including a summary of text relevant to a shoptype based on text derived from an engineering drawing (e.g., engineering drawing summary data 544), text describing a selected shoptype and related information (e.g., shoptype description data 542), and text describing a size, profile, or volume applicable to one or more part sizes (e.g., estimated part size instruction data 536). In combination, automated text query 552 provides increased amounts of information regarding a part and selection of a shoptype to enhance the accuracy of matching part specification to a subset of qualified manufacturers.

Proprietary database 572 may include data representing an accumulation of manufacturing and SMM-related data extracted from multiple interactions with multiple users (or buyers) and through data provided by multiple inquiries searching for a manufacturer that may be compatible to create or build a part. This reservoir of data enhances subsequent inquiries to determine most compatible manufacturers, especially small-to-medium manufacturers ("SMM"). An expert knowledge database 574 may include data and documents that, among other things, represent expert knowledge derived from skilled machinists, skilled mechanical engineers, skilled material engineers, and other skilled persons in a manufacturing domain. In some cases, data from a publicly accessible database 570, which may include data accessible by the World-Wide Web, may be implemented. In some examples, access to proprietary database 572 and expert knowledge database, as well as other databases facilitate implementation of retrieval-augmented generation ("RAG") to optimize output of LLM 560, LLM agent 556, or LLM agent 554, as well as shoptype LLM 541 (optionally), by referencing authoritative knowledge.

Concatenation engine 550 generates automated text query 552 that at least include two or more of a summary of text relevant to a shoptype based on text derived from an engineering drawing (e.g., engineering drawing summary data 544), text describing a selected shoptype and related information (e.g., shoptype description data 542), and text providing guidance based on a size, profile, or volume applicable to one or more part sizes (e.g., estimated part size instruction data 536). Automated text query 552 is applied to LLM agent 554.

LLM agent 554 is configured to receive user input 504 as input data 505 describing one or more requirements to manufacture a part (e.g., type of part, materials need to make the part, such as metal or plastic, certifications, whether ISO-9001 or MIL-SPEC compliances is required, quantities, delivery times, and other related manufacturing requirements). LLM agent 554 also is configured to receive automated text query 552. In some examples, LLM agent 554 may be a manufacturing-specific large language model ("LLM") chatbot configured to receive user input 504 and automated text query 552 and to optimize in dialog (e.g., natural language) with a user a query to a large language model ("LLM") 560 from which LLM agent 554 may retrieve a manufacturer list 556 of "qualified" manufacturers (e.g., qualified SMMs), whereby list 556 may include a list and accompanying data describing manufacturers (e.g., SMMs) based on a relatively high degree of similarity of user input 504 and automated text query 552 to data in LLM 560 relating to SMMs.

A resultant manufacturer list 556 may be transmitted to manufacturer list transmitter 558 that is configured to generate an inquiry 580 to a manufacturer to determine whether that manufacturer might be interested in manufacturing a part to requirements set forth therein. Also, manufacturer list 556 may be sent to ancillary data generator 559 configured to generate ancillary information, such as request for quotation ("RFQ"), that may be transmitted to manufacturer along with requirements to manufacture a part. Also shown in diagram 500 is feedback controller 557 that includes logic to generate a request for refinement (e.g., refinement request data 507) so that a user or buyer may provide additional information with which to assist LLM agent 554 in generating more relevant information relating to manufacturer list 556. For example, a user after submitting a first inquiry regarding an SMM that might produce a part in metal or plastic may follow up in a second inquiry requesting as a requirement that a manufacturer has CNC milling machines. The above-described functionalities can adapt to additional information to generate a more tailored manufacture list 556.

Training data generator 562 is configured to monitor data interactions with at least LLM agent 546, LLM agent 554, and LLM 560, as well as other components of FIG. 5 to continually and automatically update abilities of LLM 560 to subsequently identify most relevant manufacturers, such as by continually modifying weights, biases, and other parameters of an underlying neural network of LLM 560. In some cases, continual manufacturing domain adaptive pre-training can be an ability to integrate new manufacturing information from various sources of information while retaining previously learned knowledge without relying on static manufacturing domain-specific information. Therefore, LLM 560, LLM agent 556, or LLM agent 554, as well as shoptype LLM 541, may be configured to adapt and update in response to multiple accesses via input data 505 and associated information including multiple generations of automated textual queries 552.

Figure 6:
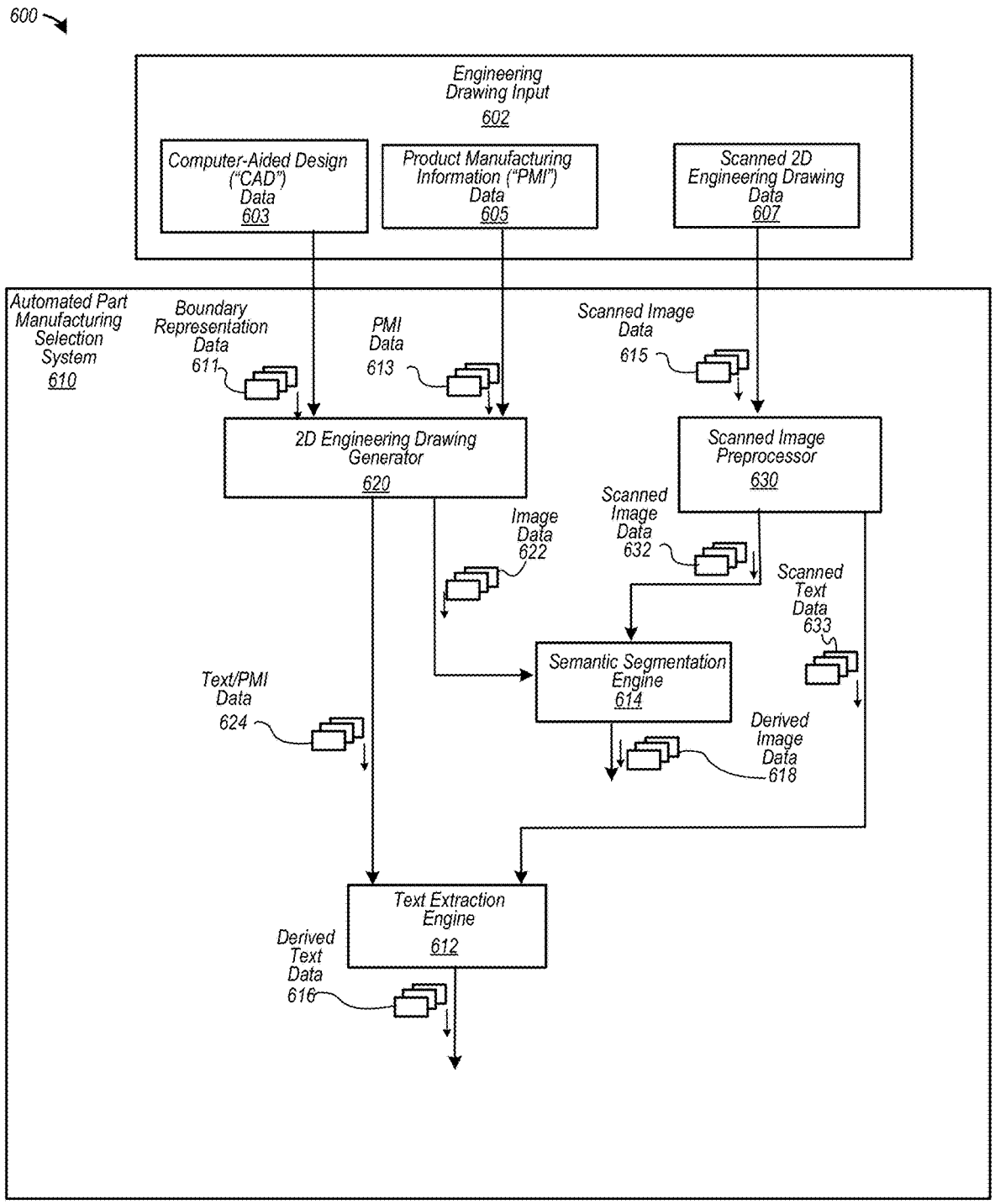
FIG. 6 illustrates an example in which an engineering drawing may be analyzed to derive text and derive images, according to some examples.

FIG. 6 illustrates an example in which an engineering drawing may be analyzed to derive text and derive images, according to some examples. Diagram 600 depicts an example of an engineering drawing input 602 and its subsidiary functionalities. As shown, engineering drawing input 602 may include computer-aided design ("CAD") data 603 and product manufacturing information ("PMI") data 605, both of which typically accompany generation of 2D engineering drawings. Engineering drawing input 602 may also include scanned 2D engineering drawing data 607 derived by capturing an image of a physical engineering drawing (e.g., a part drawn originally on paper). Engineering drawing input 602 may apply its outputs to automated part manufacturing system 610.

Computer-aided design ("CAD") data 603 and product manufacturing information ("PMI") data 605 may be generated or included as a portion of a STEP ("Standard for the Exchange of Product Data") file in accordance with ISO-10303. CAD data 603 may be associated with boundary representation data 611 expressed in a B-rep ("boundary representation") format to describe a part in 3D (e.g., a shape and a size of a part). A STEP file may also include PMI data 613 that may describe non-geometric information, such as text relating to dimensions, tolerances, surface finish, materials, and the like.

2D Engineering Drawing Generator 620 is configured to transform automatically (or semi-automatically) 3D CAD images into 2D images to form a 2D engineering drawing. As such, 2D Engineering Drawing Generator 620 is configured to generate image data 622 as a 2D engineering drawing. 2D Engineering Drawing Generator 620 is also configured to generate text 624 that may include PMI data 613.

Scanned 2D engineering drawing data 607 may include one or more images of engineering drawing(s) originally drawn on paper and may have been reproduced electronically multiple times, thereby introducing artifacts that may distort or decrease legibility of the contents of a scanned 2D engineering drawing. Scanned 2D engineering drawing data 607 is transmitted as scanned image data 615 to scanned image preprocessor 630.

Scanned image preprocessor 630 is configured to implement computer vision and imaging processing techniques to extract quality images from distorted images that may have been marred by stains, shmears, fading, over-copying, background texture or noise, or other issues that renders a scanned image less than optically desirable. For example, known OCR techniques may detect and correctly interpret text as originally drawn on paper. Scanned image preprocessor 630 is configured to implement an algorithm configured to clarify imagery of a 2D scanned engineering drawing. As an example, scanned image preprocessor 630 may be configured to implement "Otsu's method" of adaptive thresholding to separate pixels that ought to be in the foreground (part of the drawing) from a background (not part of the drawing). Scanned image preprocessor 630 may implement morphological techniques such as dilation and erosion and any other computer vision or image processing technologies to generate "cleaner" or "legible" scanned image data 632 with discernable lines, and legible scanned text data 633.

As shown, image data 622 or scanned image data 633 may be transmitted to a semantic segmentation engine 614 to generate derived image data 618. Further, text extraction engine 612 may be configured to receive or read text/PMI 624 and/or a scanned text data 633 to generate derived text data 616.

Figure 7:
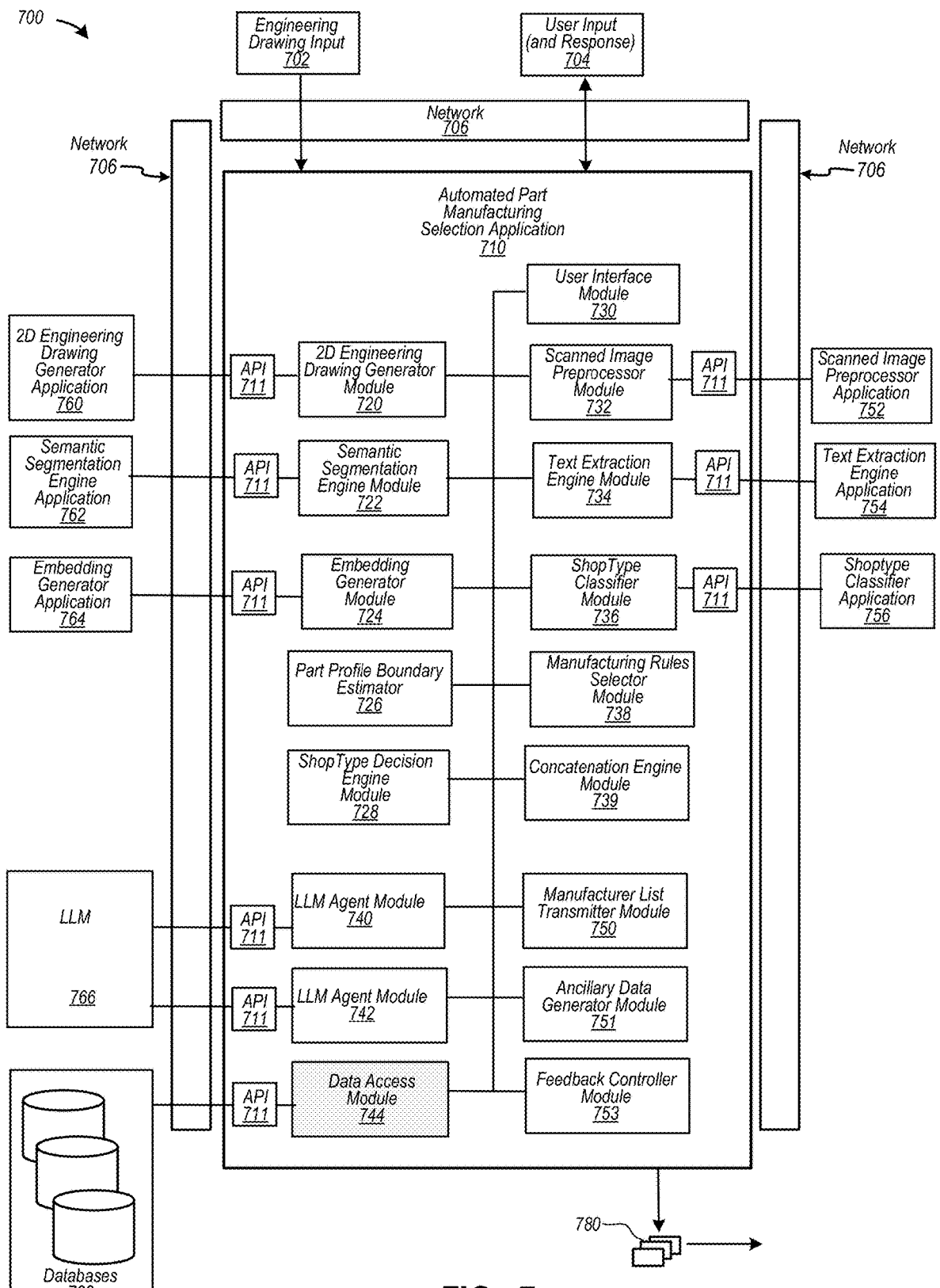
FIG. 7 is an example of a software application configured to map requirements to manufacture a part to a subset of manufacturers, at least in one example.

FIG. 7 is an example of a software application configured to map requirements to manufacture a part to a subset of manufacturers, at least in one example. Automated part manufacturing selection application 710 is configured to receive engineering drawing input 702 and user input 704, and is further configured to generate a list of manufacturers 780. In some examples, automated part manufacturing selection application 710 may include various software or logic modules configured to facilitate mapping requirement of manufacturing a part to a subset of manufacturers. Automated part manufacturing selection application 710 may be configured to execute programmatic instructions to map requirements to manufacture a part to a subset of manufacturers and may be configured to access external sources and application via APIs 711 through a network 706 (e.g., any network, including the Internet), according to some examples.

User interface module 730 is configured to facilitate interactions with a user via user input 704, for example, as a conversation in natural language or as dialogue. User interface module 730 is configured to apply inputs to an LLM agent and receive feedback, upon which a user may submit via responses as additional information to clarify and guide results of an LLM. 2D engineering drawing generator module 720 may be configured to operate similar to functions described relating to 620 of FIG. 6, and scanned image preprocessor module 732 may be configured to operate similar to functions described relating to 630 of FIG. 6. Semantic segmentation engine module 722 may perform functions equivalent to semantic segmentation engine 514 of FIG. 5. Text extraction engine module 732 may perform functions similar to text extraction engine 512 of FIG. 5. Shoptype classification module 736 may be configured to perform functions equivalent to shoptype classifier 526 of FIG. 5. Part profile boundary 726 may perform functions equivalent to part profile boundary estimator 520 of FIG. 5. Manufacturing rules selector module 738 may perform functions equivalent to manufacturing rules selector 524. Shoptype decision engine module 728 may perform functions equivalent to shoptype decision engine 540. Concatenation engine module 739 may perform functions equivalent to concatenation engine 550 of FIG. 5.

LLM agent module 740 may be configured to perform functions equivalent to LLM agent 546 of FIG. 5 to facilitate generation of engineering drawing summary data 544 of FIG. 5. LLM agent module 742 may be configured to perform functions equivalent to LLM agent 554 of FIG. 5 to facilitate generation of manufacturer list 780.

Manufacture list transmitter list module 750 may be configured to transmit a list 780 of manufacturers relevant to a requirement. Ancillary data generator module 751 may be configured to generate ancillary information of data, such as a request for quotation ("RFQ"). Feedback controller module 753 may be configured to receive, process, and transmit feedback to which a user may respond at user input 704. Data access module 744 may be configured to access databases 768, which may include a propriety database, an expert knowledge database, and any publicly available database (e.g., the World-Wide Web).

In some examples, one or more modules of diagram may extend functionalities via APIs 711. For example, 2D engineering drawing application 760, semantic segmentation engine application 762, embedding generator application 764, scanned image preprocessor application 752, text extraction engine application 754, and shoptype classifier application 756 may be accessed, in accordance with some embodiments.

Note in reference to FIG. 5, embedding generator module 724, shoptype classifier module 736 and shoptype decision engine module 728 may constitute, at least in some examples, a shoptype LLM (e.g., shoptype LLM 541 of FIG. 5). As such, embedding generator module 724, shoptype classifier module 736 and shoptype decision engine module 728 may constitute any capable LLM foundation model that may have been additionally trained with a set of examples data derived in association with shoptype description 552 of FIG. 5 and related knowledge including an expert knowledge database as part of databases 768. In other examples, embedding generator module 724, shoptype classifier module 736 and shoptype decision engine module 728 may perform as any LLM foundation model that may be enhanced in accordance with RAG principles, as described herein.

Any of the described functionalities of FIG. 7 or any other processes described herein in relation to other figures may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, as well as any proprietary application and software provided or developed by Sustainment Technologies, Inc., or the like. The above-described techniques may be varied and are not limited to the embodiments, examples or descriptions provided.

Figure 8:
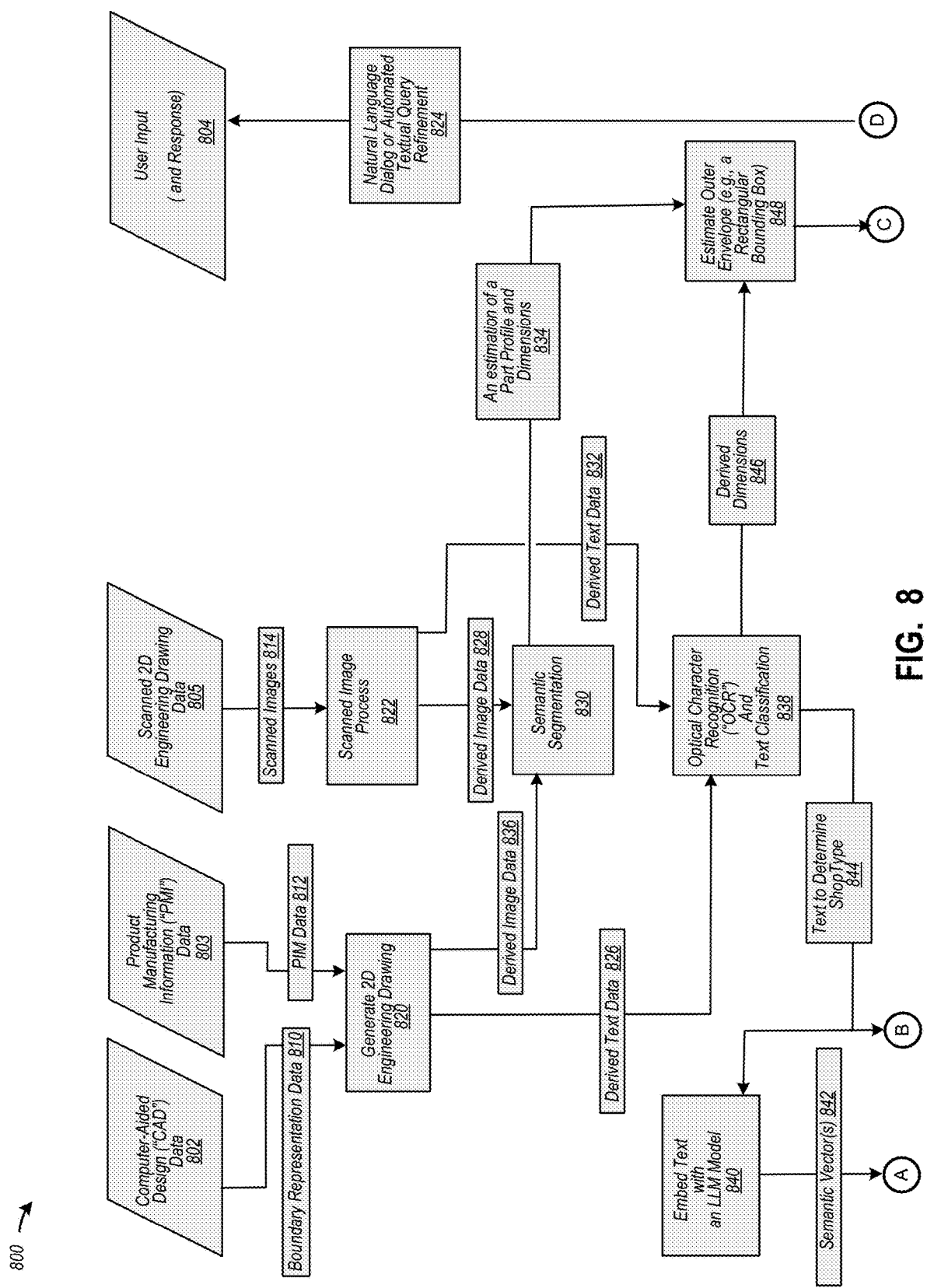
FIGS. 8 to 9 depict an example of an architecture commensurate with mapping requirements to manufacture a part to a subset of manufacturers, at least in one example.
Figure 9:
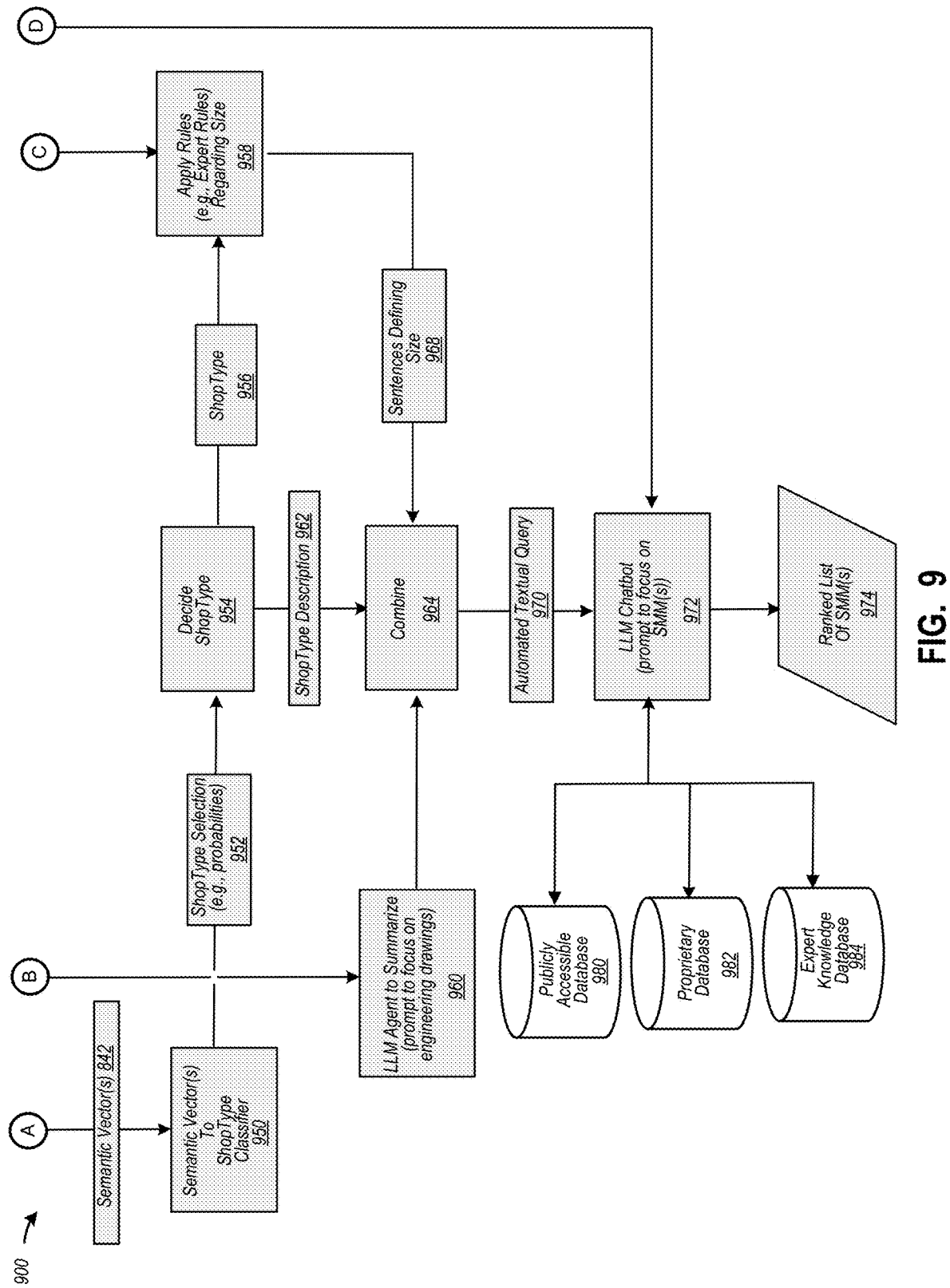

FIGS. 8 to 9 depict an example of an architecture commensurate with mapping requirements to manufacture a part to a subset of manufacturers, at least in one example. Diagram 800 of FIG. 8 depicts a first portion of an architecture in which computer-aided design ("CAD") 802, product manufacturing information ("PMI"), scanned 2D engineering drawing data 805, and user input 804 are inputs into a process consistent to as described herein. CAD 802 is configured to provide boundary representation data 810 and PMI data 803 provides PIM data 812, after which process "generate 2D engineering drawing" 820 may generate derived text data 826 and derived image data 836.

Scanned 2D engineering drawing data 805 may include scanned image data 814 for introduction into scanned image process 822. Scanned image process 822 is configured to generate derived image data 828 and derived text 832.

Semantic segmentation 830 is configured to receive derived image data 836 and/or derived image data 828 to transmit to an estimation of a part profile and dimensions 834, which may be transmitted to 'estimate outer envelope' 848. Further to diagram 800, optical character recognition ("OCR") and text classification 838 may generate text to determine shoptype 844 and provide part size-related information via derived dimensions 846. Also shown in FIG. 8, user input 804 may exchange input as natural language dialog 824. Further, text may be embedded with an LLM model at 840, which, in turn, may generate one or more semantic vectors 842.

Architecture depicted in FIG. 8 flows to FIG. 9, with encircled A, B, C, and D. As shown, semantic vectors 842 may be applied to a process 'semantic vectors to shoptype classifier' 950 to classify shoptypes equivalently to shoptype classifier 526 of FIG. 5. 'Semantic vectors to shoptype classifier' 950 may generate shoptype selection 952 that is received by 'decide shoptype' 954. As shown, 'apply rules' 958 may receive a shoptype 956 from 'decide shop type' 954 and is configured to apply rules to provide guidance regarding size in some examples. 'Decide shop type' 954 may generate a shoptype description 962 for transmission to combine 964. LLM agent 960 may generate a summary of engineering based on derived text and provide the summary to combine 964 in a natural language. 'Apply rules' 958 may be configured to generate information describing a range of sizes of a part as 'sentences defining size' 968 for transmission to combine 964. In some examples, 'apply rules' 958 may include applying manufacturing rule data.

Based on a summary of LLM agent 960, shoptype description 962, and 'sentences defining size' 968, combine 964 may generate an automated text query 970 for input into LLM chatbot 972, which is configured to access publicly accessible database 980 (e.g., the World-Wide Web), a proprietary database 982 (e.g., an SMM-centric database), and an expert knowledge database 964. LLM chatbot 960 may be configured to augment a query to an LLM using data described above. LLM chatbot 972 is configured, after querying an LLM, a ranked list 974 of manufactures, such as subset of manufacturers including SMMs.

Figure 10:
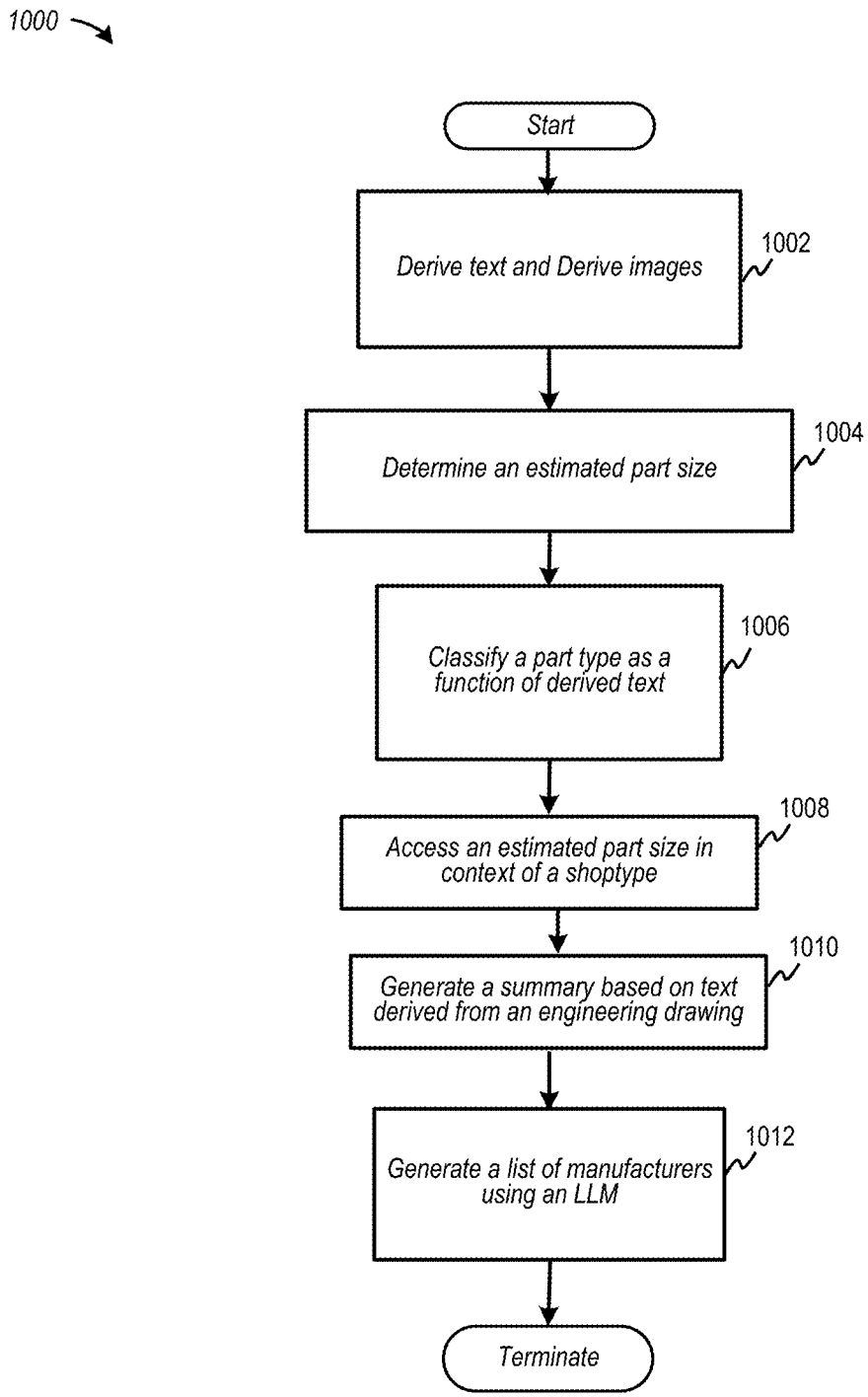
FIG. 10 is a flow diagram to exemplify mapping requirements to manufacture a part to a subset of manufacturers, at least in one example.

FIG. 10 is a flow diagram to exemplify mapping requirements to manufacture a part to a subset of manufacturers, at least in one example. Flow 1000 is configured to generate a list of qualified manufacturers, including SMMs, responsive to requirements to manufacture a part. At 1002, text and images may be derived from 2D engineering drawings accompanying a request in natural language. At 1004, an estimated part size may be determined. At 1006, a part associated with a shoptype may be classified as a function of text derived from an engineering drawing. At 1008, an estimated part size may be assessed in context of a shoptype. For example, an estimated part size may be analyzed to be out of range (e.g., in terms of size) for a shoptype, with the estimated part size may guide a search for suitable manufacturers. At 1010, a summary based on text derived from an engineering drawing may be generated. At 1012, a list of qualified manufacturers may be generated using an LLM.

Figure 11:
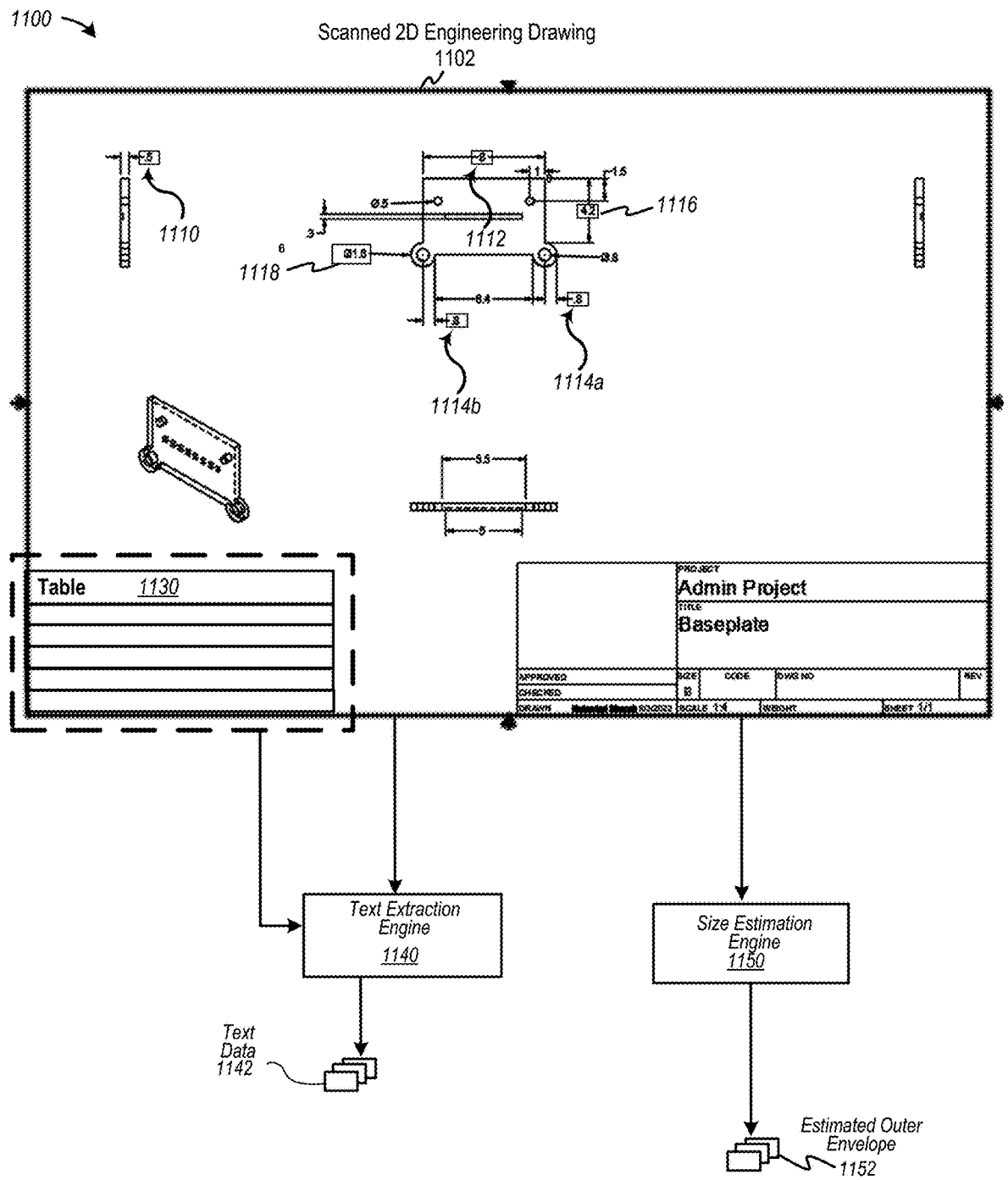
FIG. 11 is an example of an operation of a text extraction engine and a size estimation engine, according to some examples.

FIG. 11 is an example of an operation of a text extraction engine and a size estimation engine, according to some examples. Diagram 1100 depicts an example of an engineering drawing 1102 analyzed by a text extraction engine 1140 and a size estimation engine 1150. In some examples, size estimation engine 1150 may be configured to include functionalities of segmentation engine 514 and part profile boundary estimator 512, both of which are described in FIG. 5 and elsewhere herein. Referring back to FIG. 11, size estimation engine 1150 may be trained to detect dimensions 1110, 1112, 1114a, 1114b, 1116, and 1118. Further, size estimation engine 1150 may be configured to calculate data representing dimensions 1110, 1112, 1114a, 1114b, and other dimensions to determine an estimated outer envelope 1152. For example, size estimation engine 1150 may be configured to compute that dimension 1114b ("0.8")+dimension 1114a ("0.8")+dimension 1112 ("8.0") may provide a width of 9.6. Size estimation engine 1150 may be configured to compute that dimension 1116 ("4.2")+diametral dimension 1118 ("1.6") may provide a height of 5.8. Dimension 1110 ("0.5") provides a thickness dimension. Thus, size estimation engine 1150 can generate an estimation of a part size (e.g., 9.6×5.8×0.5) as an outer envelope 1154. Text extraction engine 1140 may be configured to derive text 1142 including dimensional information as well as other text, including text in table 1130 or any other portion of engineering drawing 1102. In one example, size estimation engine 1150 may be implemented as a VLM pretrained with numerous part drawings that may be annotated by expert technicians or automatically derived to set dimensions of a minimum-size rectangular bounding box for a relevant part. In operation, a drawing may be submitted to the VLM with an exemplary command: "Find minimum-size rectangular bounding box for this part."

Figure 12:
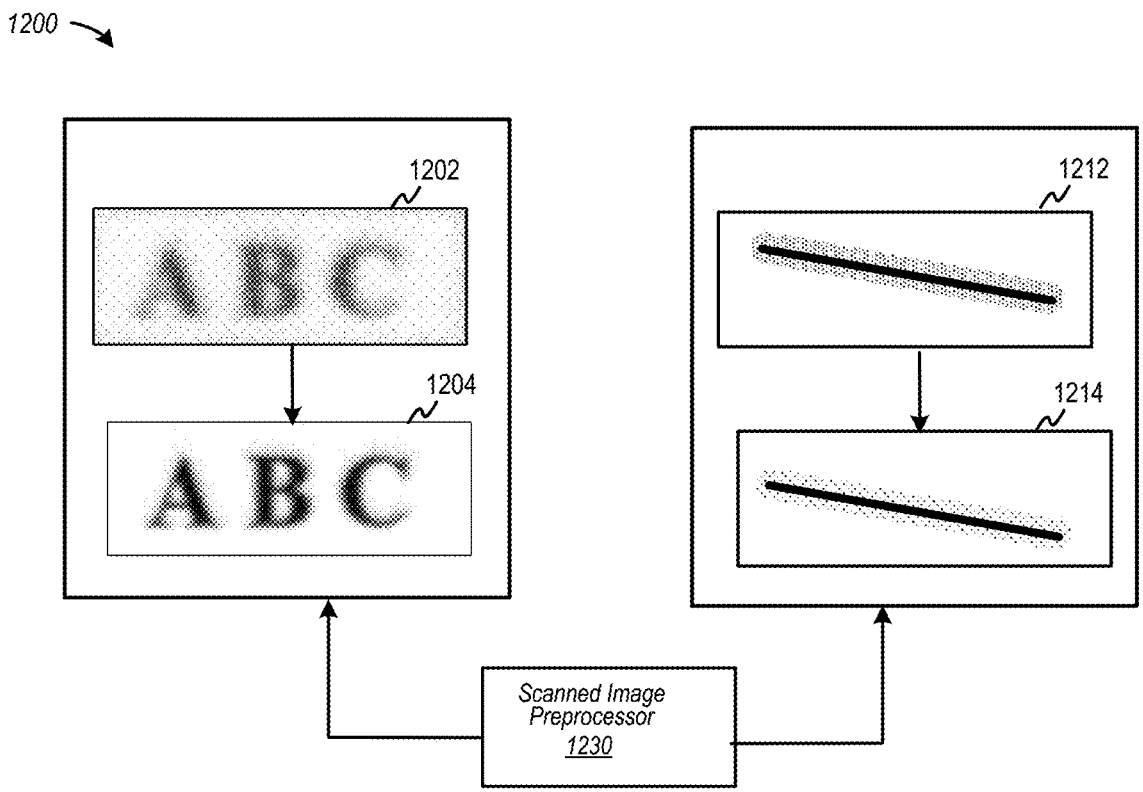
FIGS. 12 and 13 illustrate exemplary operation of a scanned image preprocessor configured to clarify images, according to some examples.
Figure 13:
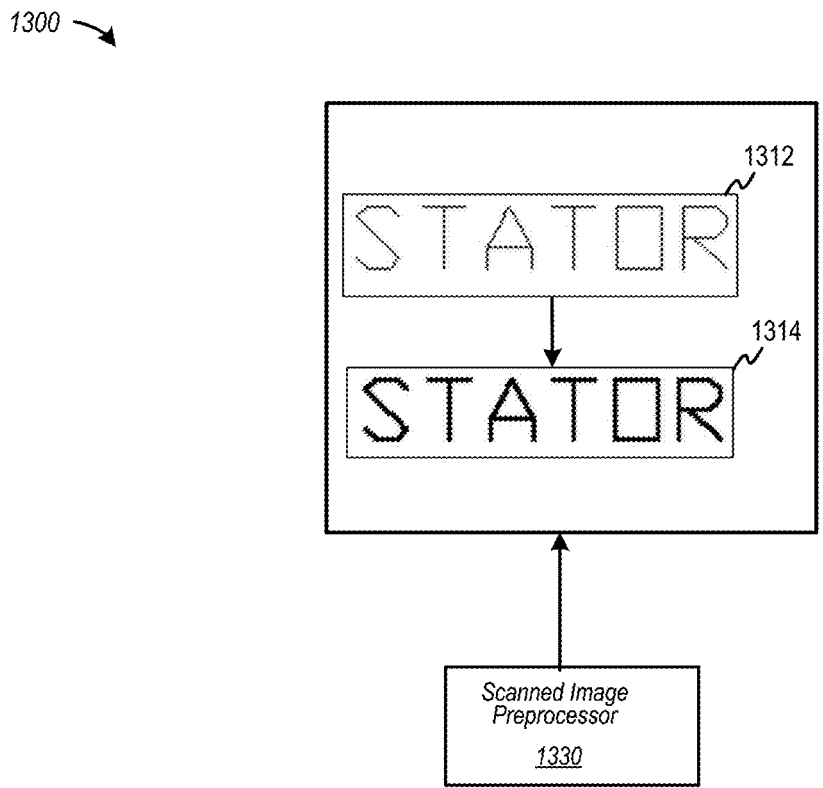

FIGS. 12 and 13 illustrate exemplary operation of a scanned image preprocessor configured to clarify images, according to some examples. FIG. 12 includes a diagram 1200 in which scanned image preprocessor 1230 may apply computer vision and image processing to elucidate text 1204 from originally scanned text 1202. Similarly, scanned image preprocessor 1230 may also be configured to form linear images 1214 from images 1212 that may be blurry, distorted, or otherwise omitting pixels when scanned.

FIG. 13 includes a diagram 1300 in which lines of a drawing (both text and part imagery) may be enhanced using scanned image preprocessor 1330. As shown, lines describing "STATOR" 1312 may be enhanced (or thickened) to derive text or lines depicted in "STATOR" 1314.

Figure 14:
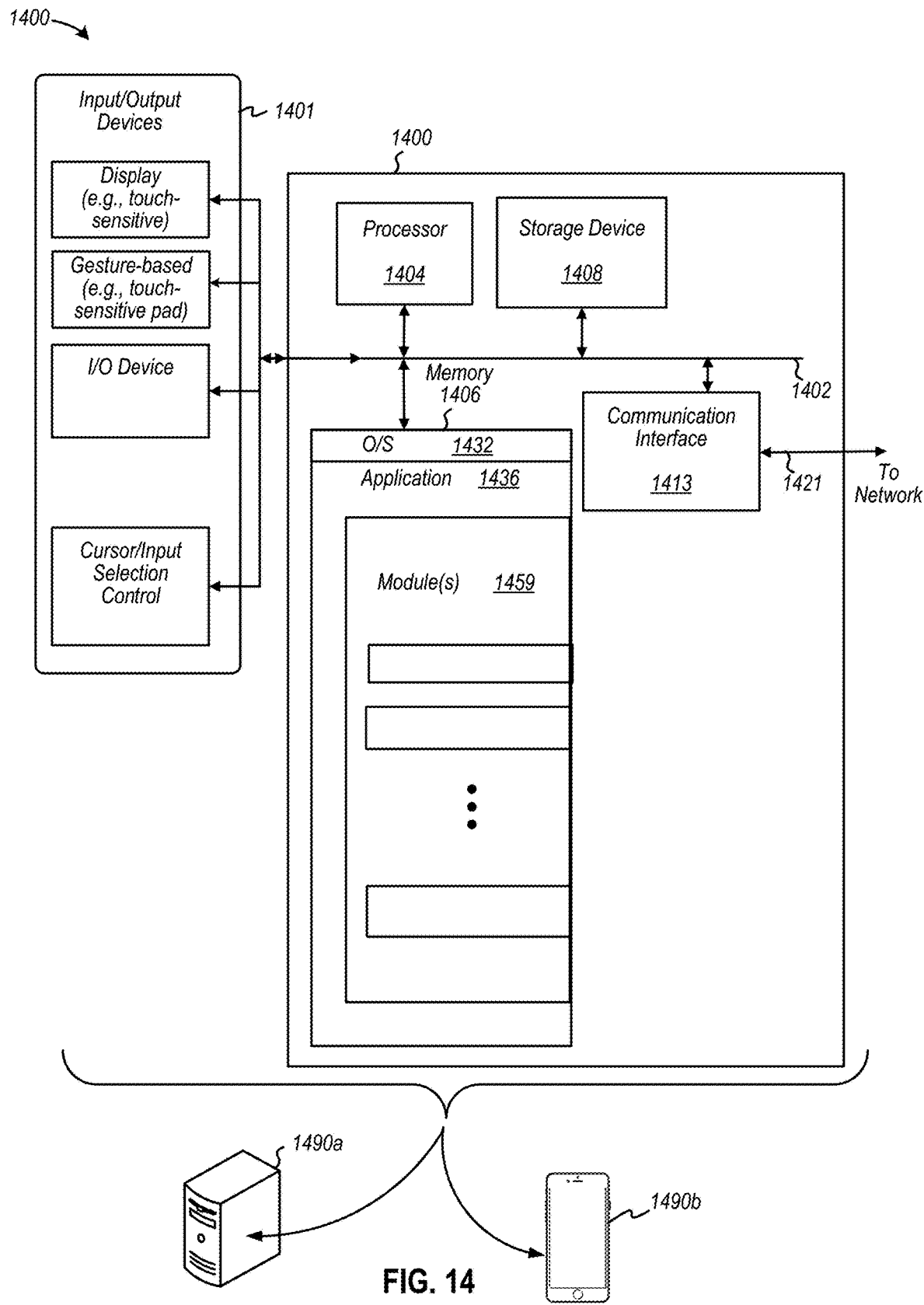
FIG. 14 illustrates examples of various computing platforms configured to provide various functionalities to components of an electronic message platform to moderate electronic messages regarding manufacturing.

FIG. 14 illustrates examples of various computing platforms configured to provide various functionalities to components of an electronic message platform 1400 to moderate electronic messages regarding manufacturing. Computing platform 1400 may be used to implement computer programs, applications, methods, processes, algorithms, or other software, as well as any hardware implementation thereof, to perform the above-described techniques.

In some cases, computing platform 1400 or any portion (e.g., any structural or functional portion) can be disposed in any device, such as a computing device 1490a, mobile computing device 1490b, and/or a processing circuit in association with initiating any of the functionalities described herein, via user interfaces and user interface elements, according to various examples.

Computing platform 1400 includes a bus 1402 or other communication mechanism for communicating information, which interconnects subsystems and devices, such as processor 1404, system memory 1406 (e.g., RAM, etc.), storage device 1408 (e.g., ROM, etc.), an in-memory cache (which may be implemented in RAM 1406 or other portions of computing platform 1400), a communication interface 1413 (e.g., an Ethernet or wireless controller, a Bluetooth controller, NFC logic, etc.) to facilitate communications via a port on communication link 1421 to communicate, for example, with a computing device, including mobile computing and/or communication devices with processors, including database devices (e.g., storage devices configured to store atomized datasets, including, but not limited to triplestores, etc.). Processor 1404 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1400 exchanges data representing inputs and outputs via input-and-output devices 1401, including, but not limited to, keyboards, mice, audio inputs (e.g., speech-to-text driven devices), user interfaces, displays, monitors, cursors, touch-sensitive displays, touch-sensitive input and outputs (e.g., touch pads), LCD or LED displays, and other I/O-related devices.

Note that in some examples, input-and-output devices 1401 may be implemented as, or otherwise substituted with, a user interface in a computing device associated with, for example, a user account identifier in accordance with the various examples described herein.

According to some examples, computing platform 1400 performs specific operations by processor 1404 executing one or more sequences of one or more instructions stored in system memory 1406, and computing platform 1400 can be implemented in a client-server arrangement, peer-to-peer arrangement, or as any mobile computing device, including smart phones and the like. Such instructions or data may be read into system memory 1406 from another computer readable medium, such as storage device 1408. In some examples, hard-wired circuitry may be used in place of or in combination with software instructions for implementation. Instructions may be embedded in software or firmware. The term "computer readable medium" refers to any tangible medium that participates in providing instructions to processor 1404 for execution. Such a medium may take many forms, including but not limited to, non-volatile media and volatile media. Non-volatile media includes, for example, optical or magnetic disks and the like. Volatile media includes dynamic memory, such as system memory 1406.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding, or carrying instructions for execution by the machine, and includes digital or analog communications signals or other intangible medium to facilitate communication of such instructions. Transmission media includes coaxial cables, copper wire, and fiber optics, including wires that comprise bus 1402 for transmitting a computer data signal.

In some examples, execution of the sequences of instructions may be performed by computing platform 1400. According to some examples, computing platform 1400 can be coupled by communication link 1421 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1400 may transmit and receive messages, data, and instructions, including program code (e.g., application code) through communication link 1421 and communication interface 1413. Received program code may be executed by processor 1404 as it is received, and/or stored in memory 1406 or other non-volatile storage for later execution.

In the example shown, system memory 1406 can include various modules that include executable instructions to implement functionalities described herein. System memory 1406 may include an operating system ("O/S") 1432, as well as an application 1436 and/or logic module(s) 1459. In the example shown in FIG. 14, system memory 1406 may include any number of modules 1459, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 1459 of FIG. 14, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1459 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1459 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1459 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method comprising:
receiving either a first user input or a second user input, or both, as an input including data representing requirements to manufacture a physical structure via an electronic network at a computing platform including one or more processors and one or more data stores;
concatenating at least two of engineering drawing summary data, a shoptype description, and estimated part size instruction data to combine the at least two of the engineering drawing summary data, the shoptype description, and the estimated part size instruction data;
generating an automated text query based on a combination of the at least two of the engineering drawing summary data, the shoptype description, and the estimated part size instruction data;
implementing a retrieval-augmented generation ("RAG") algorithmic process to configure a manufacturing-specific prompt based on either the first user input or the second user input to access a proprietary database;
transmitting the first user input and the automated text query to a large language model as a function of the manufacturing-specific prompt; and
generating an output of the large language model including data representing a list of entities enabled to manufacture the physical structure in accordance with the requirements.

2. The method of claim 1 further receiving the first user input comprises:
receiving the data representing the requirements to manufacture the physical structure in a natural language including strings of one or more of text including alpha-numeric characters, wherein the strings comprise one or more of sentences, paragraphs, and electronic documents.

3. The method of claim 1 wherein either the first user input or the second user input, or both, comprises:
derived text data and derived image data of a digitized copy of a physical 2D engineering drawing.

4. The method of claim 1 further comprises:
receiving a second user input associated with the data representing the requirements to manufacture the physical structure, wherein the second user input is a digitized copy of a physical 2D engineering drawing depicting the physical structure.

5. The method of claim 4 further comprises:
analyzing the digitized copy of a physical 2D engineering drawing; and deriving text including alpha-numeric characters to form derived text and derived image-based profile attributes to form derived image-based profile attributes.

6. The method of claim 1 wherein at least a portion of the second input is applied to the large language model, wherein the large language model includes a vision language model ("VLM").

7. The method of claim 1 further comprises:
analyzing selection data to generate a shoptype description and a shoptype,
wherein the selection data is based on derived text from a digitized copy of a physical 2D engineering drawing.

8. The method of claim 1 further comprises:
estimate a size of the physical structure based on derived text and derived image-based profile attributes from a digitized copy of a physical 2D engineering drawing to form the estimated part size instruction data.

9. The method of claim 1 further comprises:
applying manufacturing rule data to a shoptype based on an estimated size of the physical structure; and
generating estimated part size instruction data as a natural language including strings of one or more of text including alpha-numeric characters.

10. The method of claim 9 wherein the manufacturing rule data comprise criteria to generate the list of entities enabled to manufacture the physical structure, the manufacturing rule data being expressed in a natural language.

11. The method of claim 1 further comprises:
applying manufacturing rule data to a shoptype based on an estimated size of the physical structure; and
generating the estimated part size instruction data as a natural language.

12. The method of claim 1 wherein the list of entities includes manufacturers.

13. The method of claim 12 wherein the list of entities includes a ranked subset of the manufacturers, which are ranked at least as a function of a shoptype and the requirements.

14. The method of claim 1 further comprising:
applying the input data and the automated text query to an agent program configured to interoperate with the large language model.

15. A system comprising:
a data store configured to store executable instructions; and
a processor configured to implement the executable instructions configured to:
receive a user input including data representing requirements to manufacture a physical structure via an electronic network at a computing platform including one or more processors and one or more data stores;
concatenate at least two of engineering drawing summary data, a shoptype description, and estimated part size instruction data to combine the at least two of the engineering drawing summary data, the shoptype description, and the estimated part size instruction data;
generate an automated text query based on a combination of the at least two of the engineering drawing summary data, the shoptype description, and the estimated part size instruction data;
implement a retrieval-augmented generation ("RAG") algorithmic process to configure a manufacturing-specific prompt based on either the first user input or the second user input to access a proprietary database;
transmit the user input and the automated text query to a large language model as a function of the manufacturing-specific prompt; and
generate an output of the large language model including data representing a list of entities enabled to manufacture the physical structure in accordance with the requirements.

16. The system of claim 15 wherein the processor is further configured to:
receive the user input including derived text data and derived image data of a digitized copy of a physical 2D engineering drawing depicting the physical structure.

17. The system of claim 16 wherein the processor configured is further configured to:
receive another user input associated with the data representing the requirements to manufacture the physical structure, wherein the another user input is a digitized copy of a physical 2D engineering drawing depicting the physical structure;
analyze the digitized copy of a physical 2D engineering drawing; and
derive text including alpha-numeric characters to form derived text and derived image-based profile attributes to form derived image-based profile attributes.

18. The system of claim 15 wherein the processor is further configured to:
apply the input data and the automated text query as natural language to an agent program configured to interoperate with the large language model, wherein the agent program is a manufacturing-specific chatbot configured to accept natural language inputs to interoperate with the large language model.

19. A non-transitory computer readable medium having one or more computer program instructions configured to perform a method, the method comprising:
receiving a user input including data representing requirements to manufacture a physical structure via an electronic network at a computing platform including one or more processors and one or more data stores;
concatenating at least two of engineering drawing summary data, a shoptype description, and estimated part size instruction data to combine the at least two of the engineering drawing summary data, the shoptype description, and the estimated part size instruction data;
generating an automated text query based on a combination of the at least two of the engineering drawing summary data, the shoptype description, and the estimated part size instruction data;
implementing a retrieval-augmented generation ("RAG") algorithmic process to configure a manufacturing-specific prompt based on either the first user input or the second user input to access a proprietary database;
transmitting the user input and the automated text query to a large language model as a function of the manufacturing-specific prompt; and
generating an output of the large language model including data representing a list of entities enabled to manufacture the physical structure in accordance with the requirements.

20. The method of claim 19 further comprises:
receiving the user input as derived text data and derived image data of a digitized copy of a physical 2D engineering drawing, or
receiving another user input associated with the data representing the requirements to manufacture the physical structure, wherein the another user input is a digitized copy of a physical 2D engineering drawing depicting the physical structure.

* * * * *